United States Patent
Rathgeber et al.

(10) Patent No.: US 8,303,778 B2
(45) Date of Patent: Nov. 6, 2012

(54) METHOD AND DEVICE FOR GENERATING MOVEMENT IN A THIN LIQUID FILM

(75) Inventors: Andreas Rathgeber, Munich (DE); Matthias Wassermeier, Munich (DE)

(73) Assignee: Beckman Coulter, Inc., Brea, CA (US)

(*) Notice: Subject to any disclaimer, the term of this patent is extended or adjusted under 35 U.S.C. 154(b) by 0 days.

(21) Appl. No.: 12/870,033

(22) Filed: Aug. 27, 2010

(65) Prior Publication Data
US 2011/0188337 A1 Aug. 4, 2011

Related U.S. Application Data

(63) Continuation of application No. 10/547,263, filed as application No. PCT/EP2004/000688 on Jan. 27, 2004, now abandoned.

(30) Foreign Application Priority Data

| Feb. 27, 2003 | (DE) | .................... | 103 08 622 |
| Mar. 3, 2003 | (DE) | .................... | 103 09 183 |
| Jun. 4, 2003 | (DE) | .................... | 103 25 313 |

(51) Int. Cl.
*B01J 19/10* (2006.01)
*B06B 1/00* (2006.01)
*B01F 11/02* (2006.01)

(52) U.S. Cl. ............... 204/157.42; 422/20; 422/128; 366/108; 366/127; 366/144

(58) Field of Classification Search .............. 366/127, 366/244, 144, 108; 422/20, 128; 204/157.42
See application file for complete search history.

(56) References Cited

U.S. PATENT DOCUMENTS

| 2,420,864 A | 5/1947 | Chilowsky |
| 3,343,105 A | 9/1967 | Van Der Pauw |
| 3,433,461 A | 3/1969 | Scarpa |
| 3,575,383 A | 4/1971 | Coleman |
| 3,665,225 A | 5/1972 | Van den Heuvel et al. |
| 3,727,718 A | 4/1973 | Whitehouse |
| 3,745,812 A | 7/1973 | Korpel |
| 4,173,009 A | 10/1979 | Toda |
| 4,296,348 A | 10/1981 | Toda |
| 4,453,242 A * | 6/1984 | Toda ........................... 369/132 |

(Continued)

FOREIGN PATENT DOCUMENTS
DE   19833197   2/1999
(Continued)

OTHER PUBLICATIONS

Milsom and Reilly, Abstract: Analysis of generation and detection of surface and bulk acoustic waves by interdigital transducers from IEEE Transactions on Sonics and Ultrasonics, vol. SU-24, May 1977, p. 147-166. (total 1 page).*

(Continued)

*Primary Examiner* — Tony G Soohoo
(74) *Attorney, Agent, or Firm* — Kilpatrick Townsend & Stockton LLP

(57) ABSTRACT

The invention relates to a method for generating motion in a thin liquid film on a substrate, in particular in a capillary gap, in which at least one ultrasound wave is sent right through the substrate in the direction of the liquid film, and a device for carrying out the inventive method.

32 Claims, 19 Drawing Sheets

U.S. PATENT DOCUMENTS

Figure 8A:
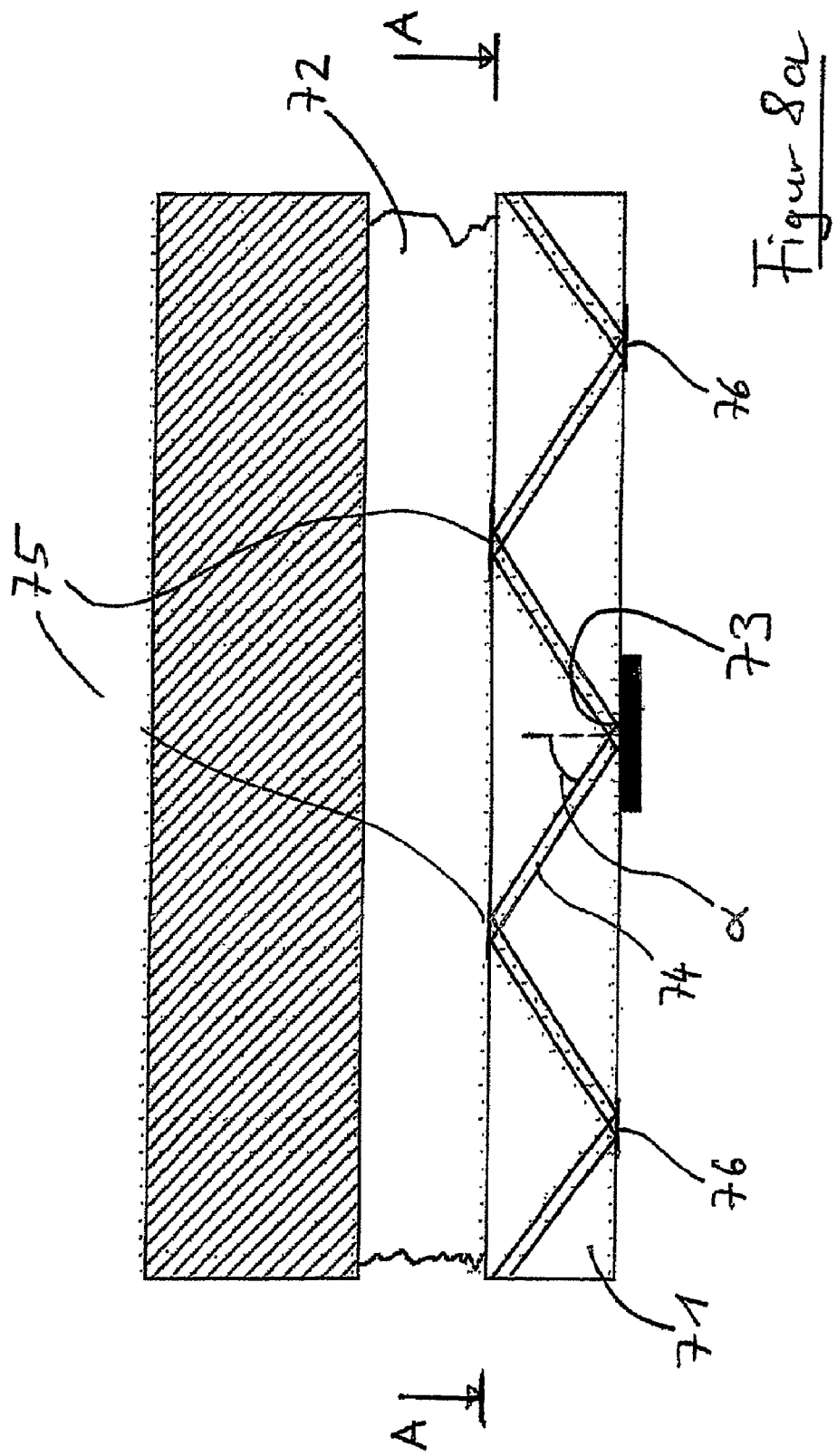

| | | | |
|---|---|---|---|
| 4,691,982 | A | 9/1987 | Nishimura et al. |
| 4,692,654 | A | 9/1987 | Umemura et al. |
| 4,697,195 | A | 9/1987 | Quate et al. |
| 4,746,882 | A | 5/1988 | Solie |
| 4,908,542 | A | 3/1990 | Solie |
| 4,978,503 | A | 12/1990 | Shanks et al. |
| 5,006,749 | A | 4/1991 | White |
| 5,192,502 | A | 3/1993 | Attridge et al. |
| 5,196,720 | A * | 3/1993 | Sugai et al. .................. 257/254 |
| 5,512,492 | A | 4/1996 | Herron et al. |
| 5,646,039 | A * | 7/1997 | Northrup et al. ........... 435/287.2 |
| 5,674,742 | A | 10/1997 | Northrup et al. |
| 5,717,434 | A | 2/1998 | Toda |
| 5,736,100 | A | 4/1998 | Miyake et al. |
| 5,902,489 | A | 5/1999 | Yasuda et al. |
| 6,010,316 | A * | 1/2000 | Haller et al. .................. 417/322 |
| 6,168,948 | B1 | 1/2001 | Anderson et al. |
| 6,244,738 | B1 | 6/2001 | Yasuda et al. |
| 6,316,274 | B1 | 11/2001 | Herron et al. |
| 6,357,907 | B1 | 3/2002 | Cleveland et al. |
| 6,431,184 | B1 | 8/2002 | Taniyama |
| 6,568,052 | B1 | 5/2003 | Rife et al. |
| 6,720,710 | B1 | 4/2004 | Wenzel et al. |
| 6,948,843 | B2 | 9/2005 | Laugharn, Jr. et al. |
| 7,808,631 | B2 * | 10/2010 | Murakami .................... 356/244 |
| 2001/0055529 | A1 | 12/2001 | Wixforth |
| 2002/0009015 | A1 | 1/2002 | Laugharn et al. |
| 2004/0072366 | A1 | 4/2004 | Wasserbauer |
| 2004/0115097 | A1 | 6/2004 | Wixforth et al. |
| 2004/0257906 | A1 | 12/2004 | Scriba et al. |
| 2005/0003737 | A1 | 1/2005 | Montierth et al. |
| 2006/0049714 | A1 * | 3/2006 | Liu et al. .................. 310/313 R |
| 2006/0096353 | A1 | 5/2006 | Hawkes et al. |
| 2006/0230833 | A1 | 10/2006 | Liu et al. |
| 2008/0095667 | A1 | 4/2008 | Murakami et al. |
| 2008/0316477 | A1 | 12/2008 | Murakami |

FOREIGN PATENT DOCUMENTS

| | | |
|---|---|---|
| DE | 10117772 | 10/2002 |
| DE | 10142788 | 3/2003 |
| EP | 0516565 | 12/1992 |
| WO | WO 97/25531 | 7/1997 |
| WO | WO 01/10011 | 2/2000 |
| WO | WO 00/25125 | 5/2000 |
| WO | WO 01/20781 | 3/2001 |
| WO | WO 02/28523 | 4/2002 |
| WO | WO 03/018181 | 3/2003 |

OTHER PUBLICATIONS

Wohitjen and Dessy, "Surface Acoustic Wave Probe for Chemical Analysis", Analytical Chemistry, vol. 51, No. 9, Aug. 1979 pp. 1458-1464.*

SAO/NASA ADS arXiv e-prints Abstract Service, 2 page abstract of "Acoustic 'ditrubuted source' mixing of smallest fluid volumes", publication eprint, arXiv:physics/0306080, published Jun. 2003.*

L. M. Dorozhkin and I. A. Rozanov, "Acoustic Wave Chemical Sensors for Gases", Journal of Analytical Chemistry, vol. 56, No. 5, 2001, pp. 399-416. Translated from Zhurnal Analiticheskoi Khimii, vol. 56, No. 5, 2001, pp. 455-474. Original Russian Text Copyright © 2001 by Dorozhkin, Rozanov.*

A. Rathgeber, M. Wassermeier, "Acoustic 'distributed source' mixing of smallest fluid volumes", Experimentalphysik I, University of Augsburg, Augsburg Germany (submitted: Jun. 10, 2003), total 11 pages.*

Kazuhiko Yamanouchi and Fumio Kadosawa, "An Electroacoustic Surface-Wave Convolver of Fabricated From a Thin Piezoelectric Film and a Semiconductor", Electronics and Communications in Japan. Part 2. vol. 75. No. 12, 1992 Translated from Denoh! Joho TlUohin alkbi Ronbunohi, vol. 7S-C-I. No. 6. Jun. 1992. pp. 468-477.*

Guttenberg,1 A. Rathgeber, S. Keller, J. O. Rädler, A. Wixforth, M. Kostur, M. Schindler, and P. Talkner; "Flow profiling of a surface-acoustic-wave nanopump", Physical Review E 70, 056311 (2004), © 2004 The American Physical Society, total 10 pages.*

Nyborg; "Acoutic Streaming"; 1965, *Physical Acoustics*, vol. 2B, pp. 265-271.

Shiokawa et al.; "Liquid Streaming and Droplet Formation Caused by Leakey Rayleigh Waves"; 1989, *IEEE Proceedings of Ultrasonics Symposium*, pp. 643-646.

Vivek et al.; "Novel Acoustic-Wave Micromixer"; 2002, *IEEE International Microelectro Mechanical Systems Conference*, pp. 668-673.

Yang et al.; "Ultrasomic Micromixer for Microfluidic Systems"; 2000, *IEEE* pp. 80-85.

Zhu et al.; "Microfluidic Motion Generation with Acoustic Waves"; 1998, *Sensors and Actuators*, vol. 66, pp. 355-360.

* cited by examiner

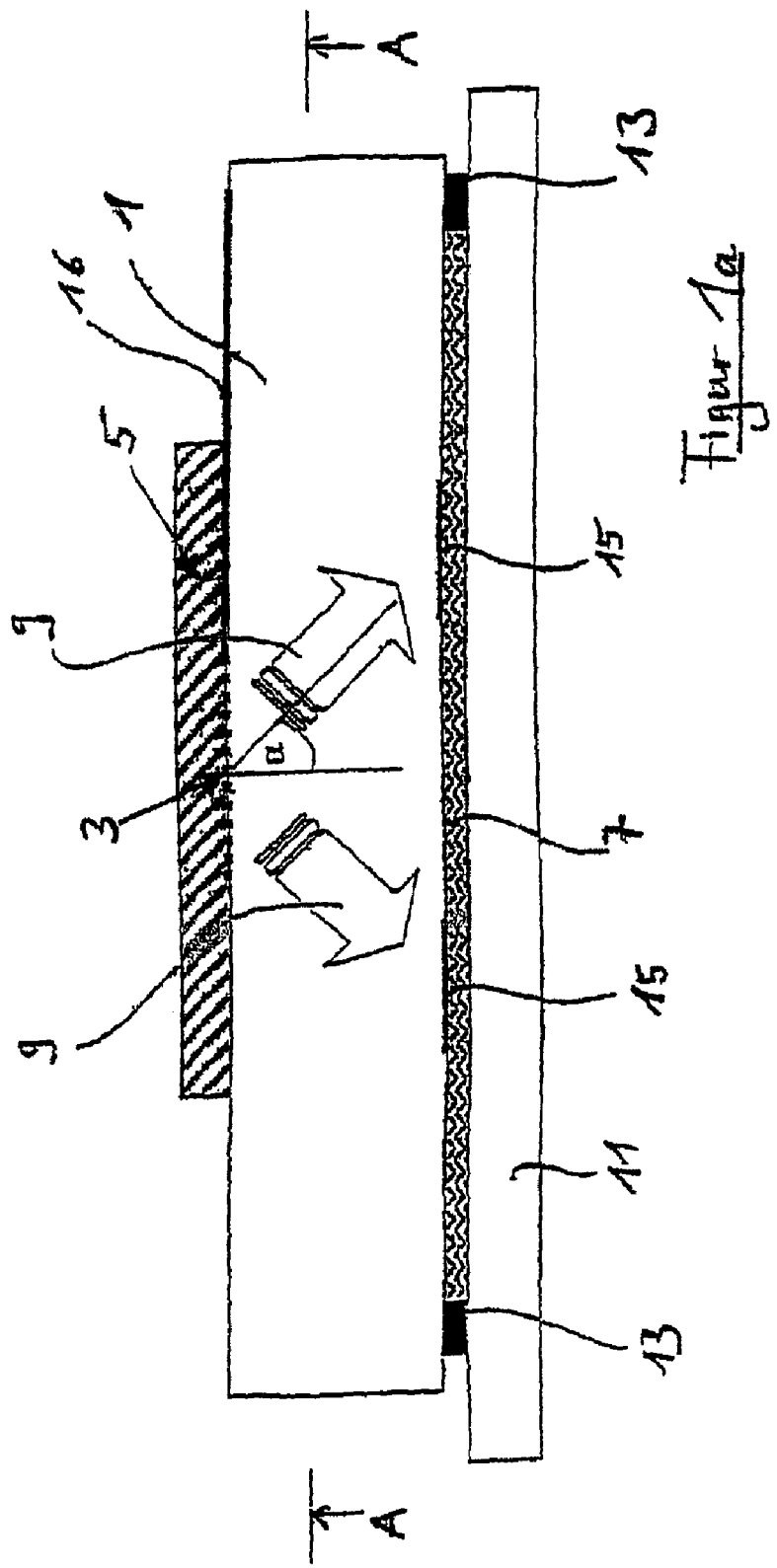

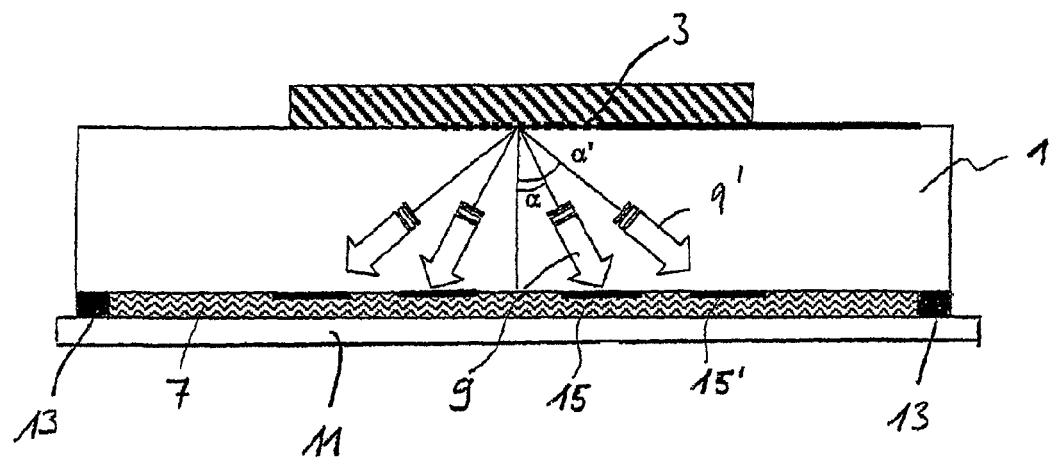
Figur 1b

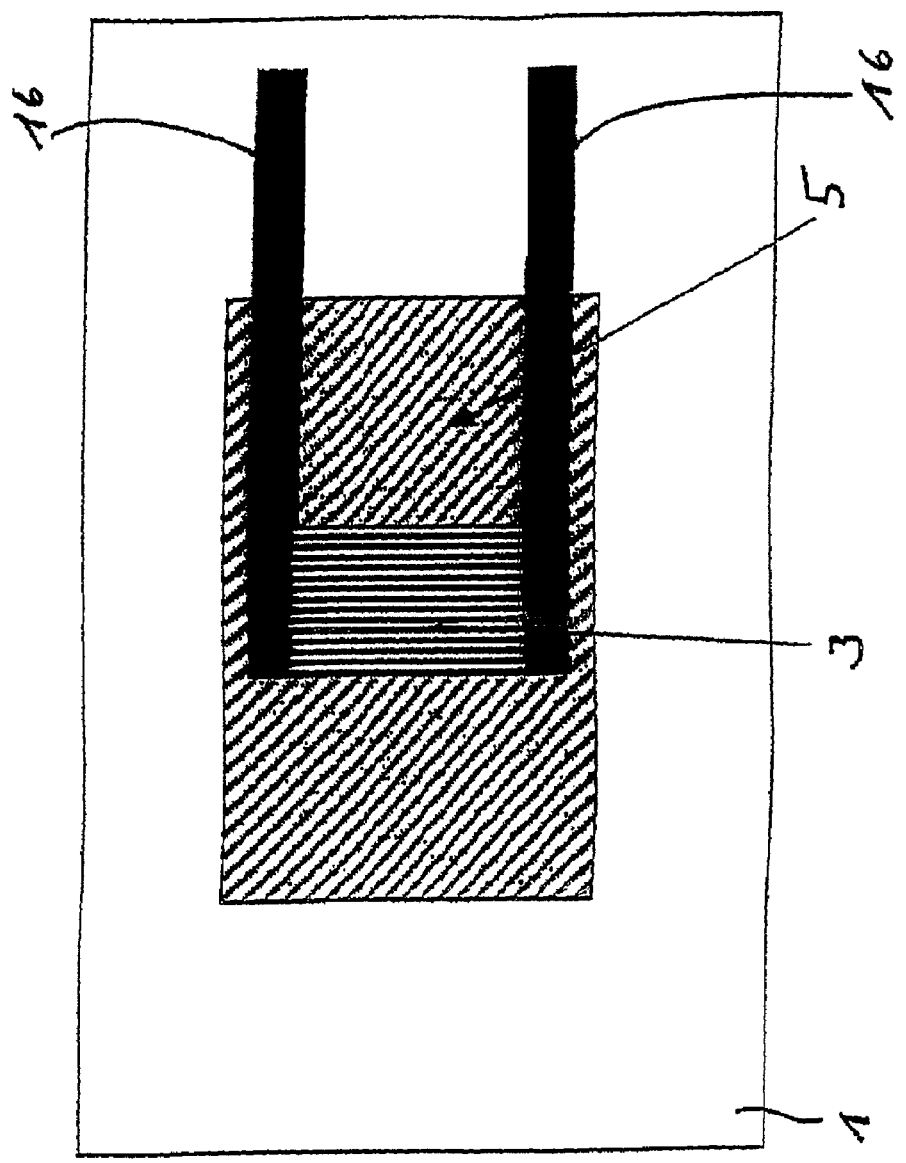

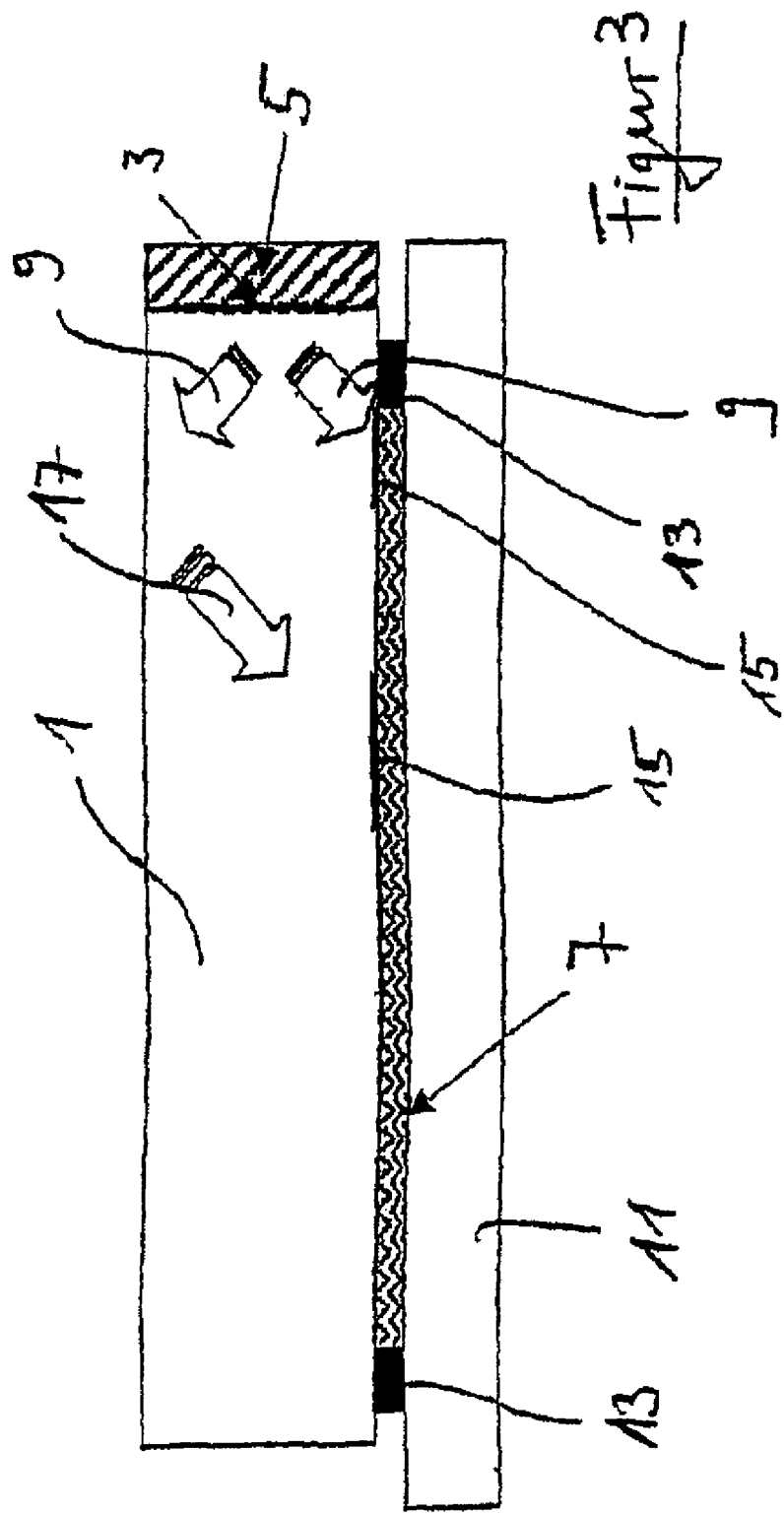

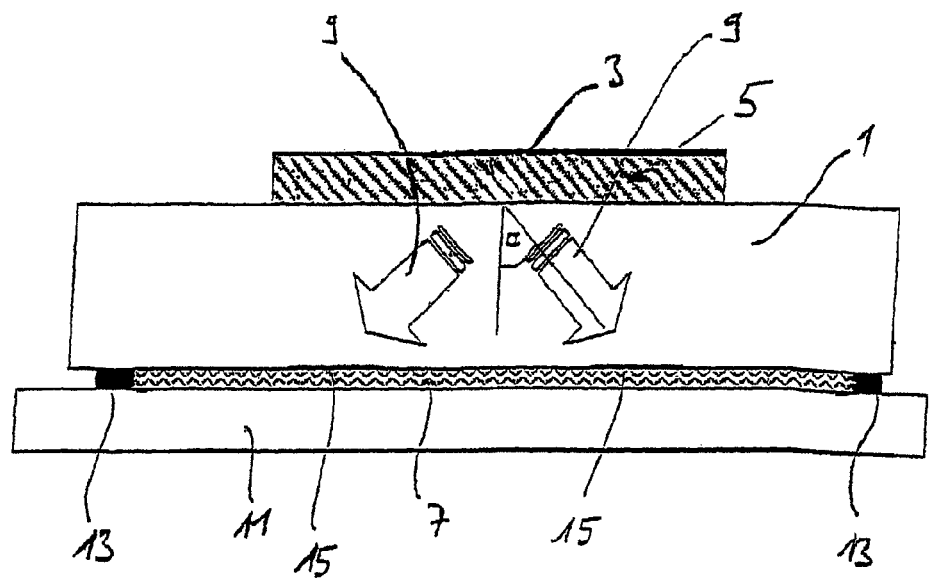
Figur 4
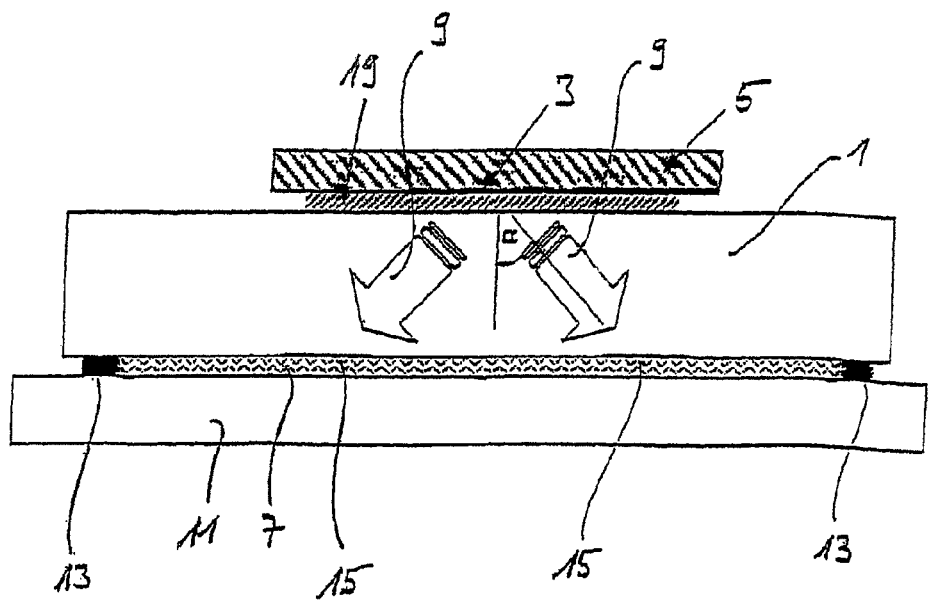
Figur 5

Figur 6
a)
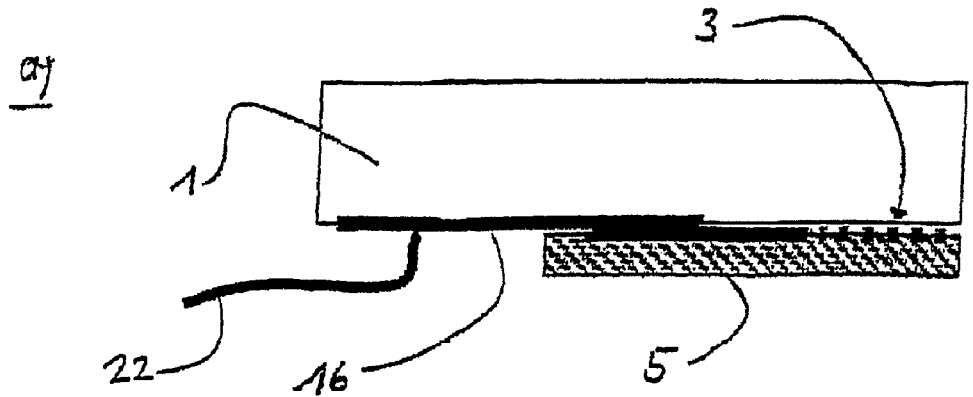
b)
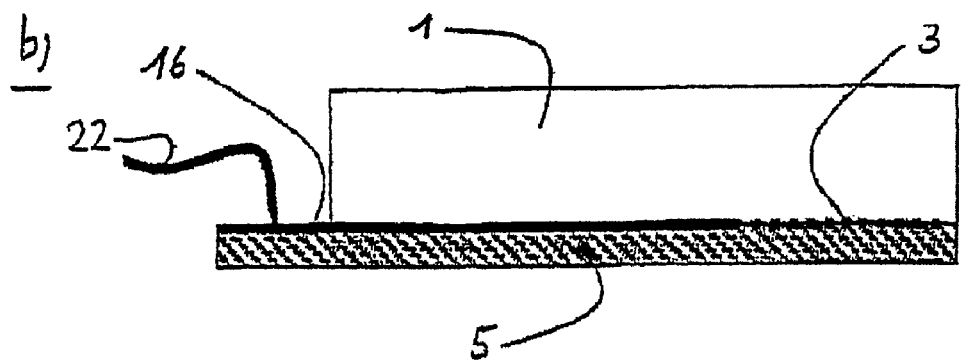
c)
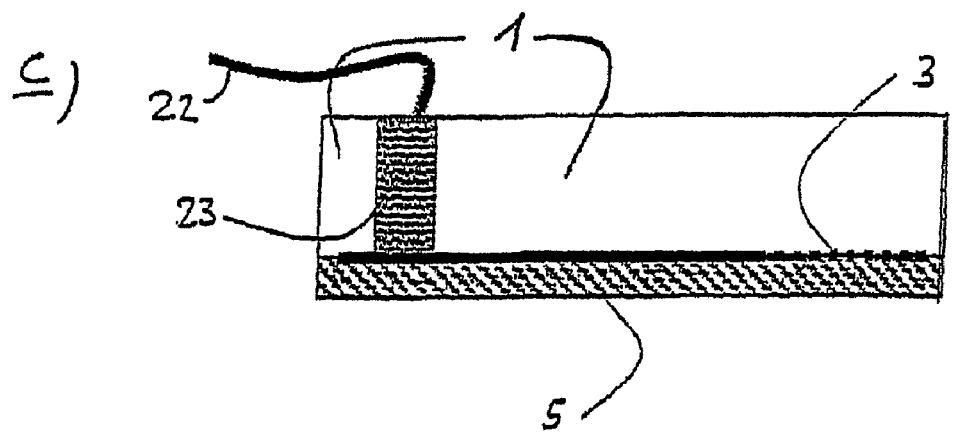

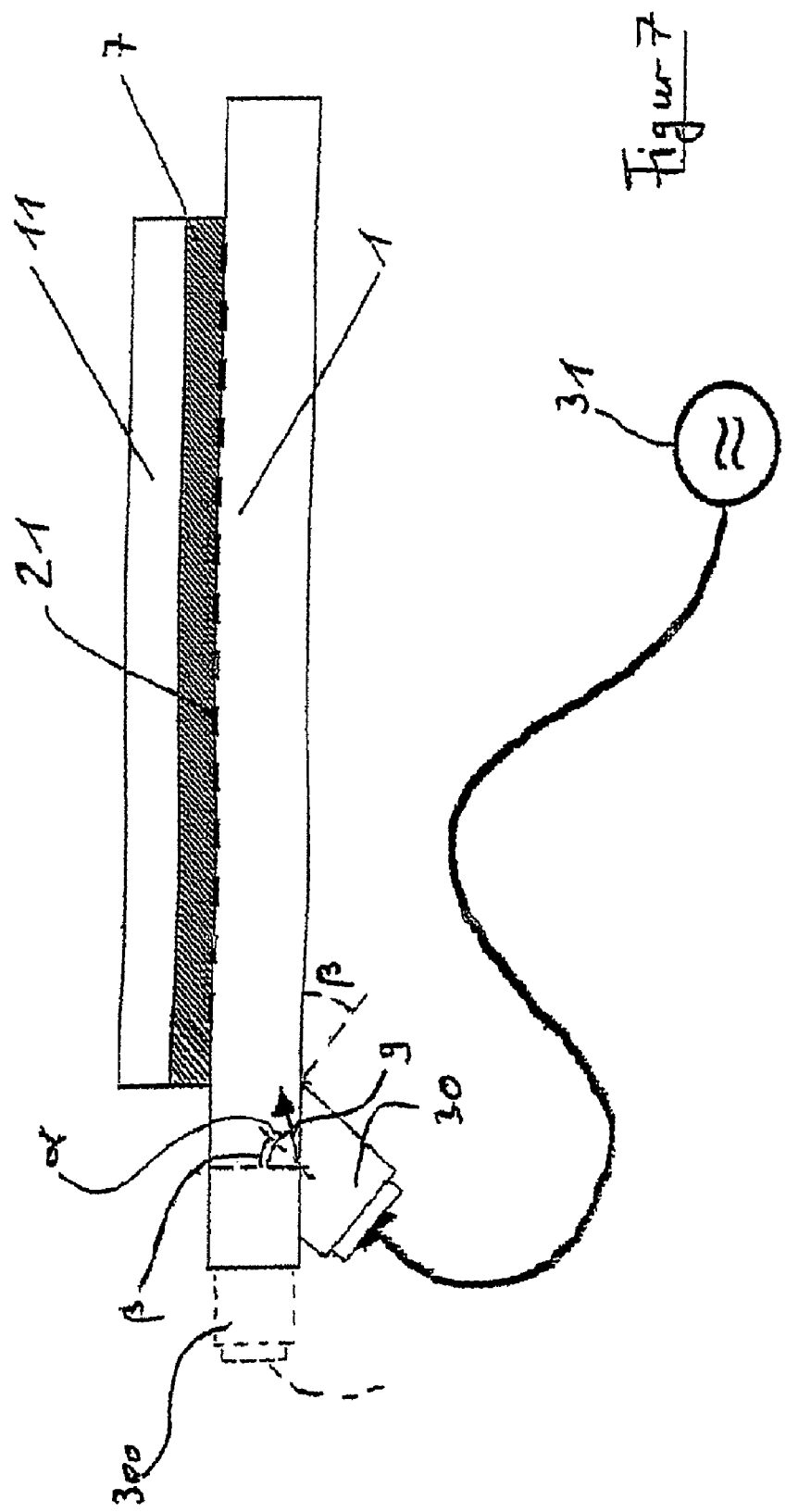

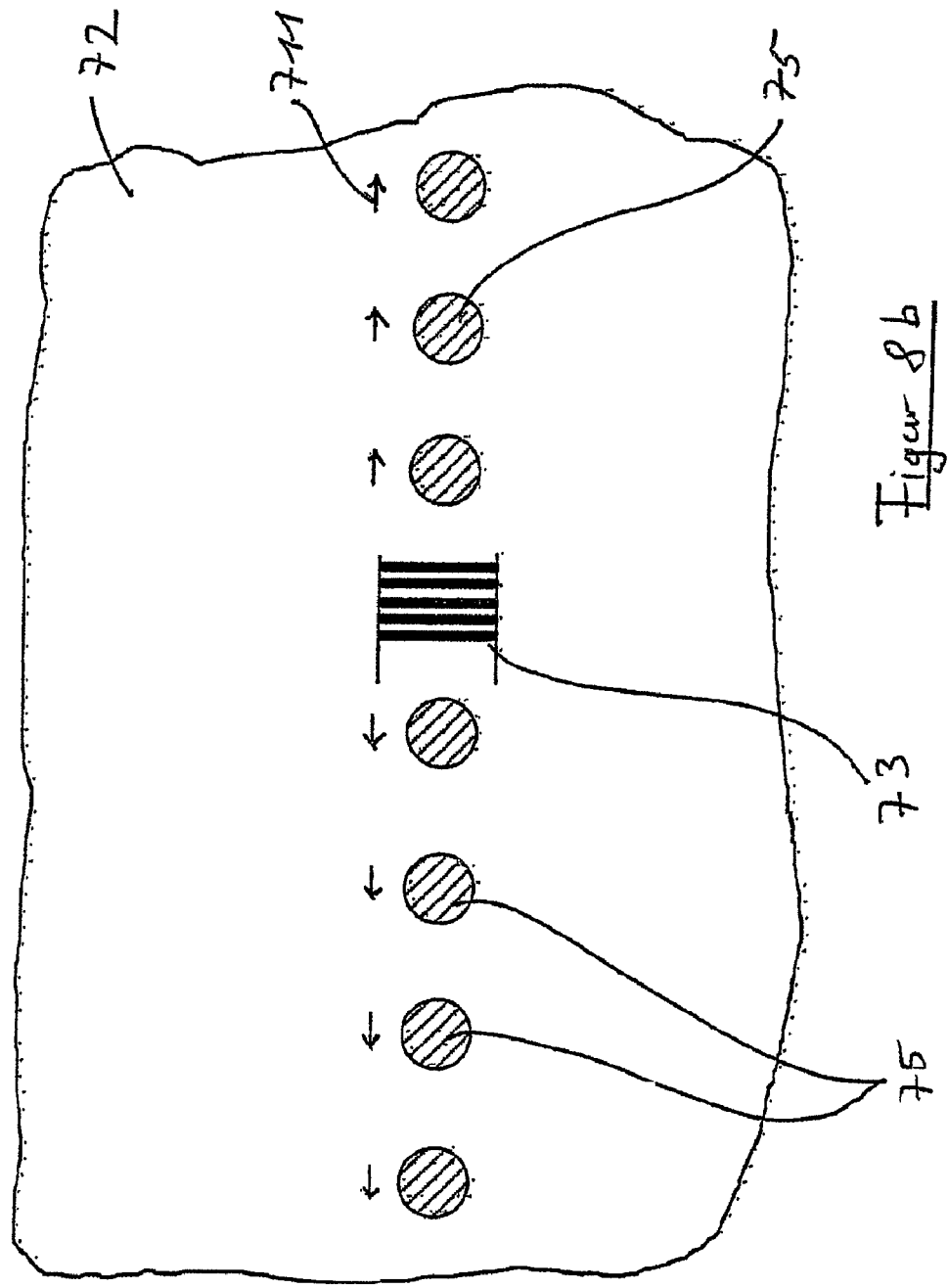

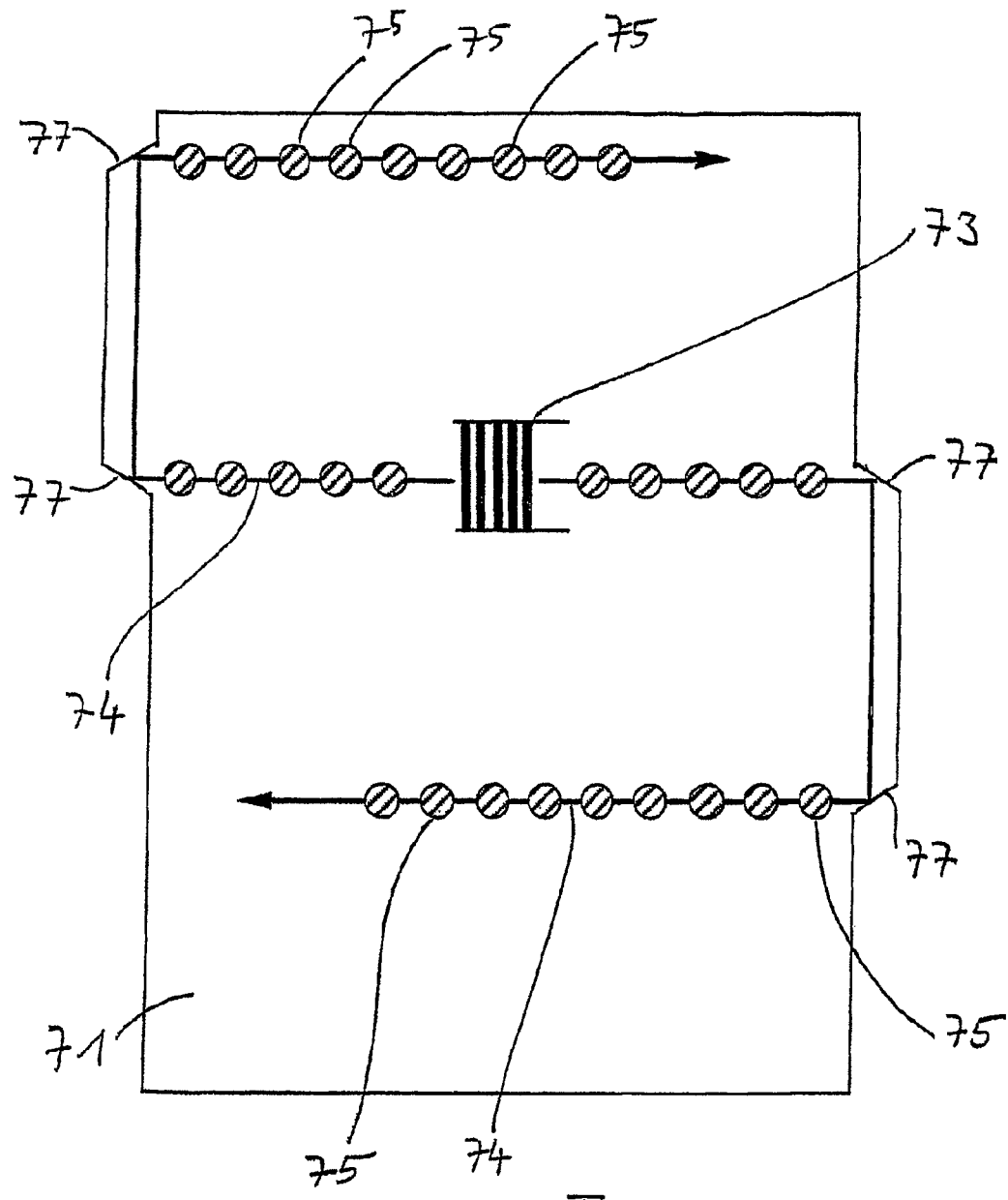
Figur 10a

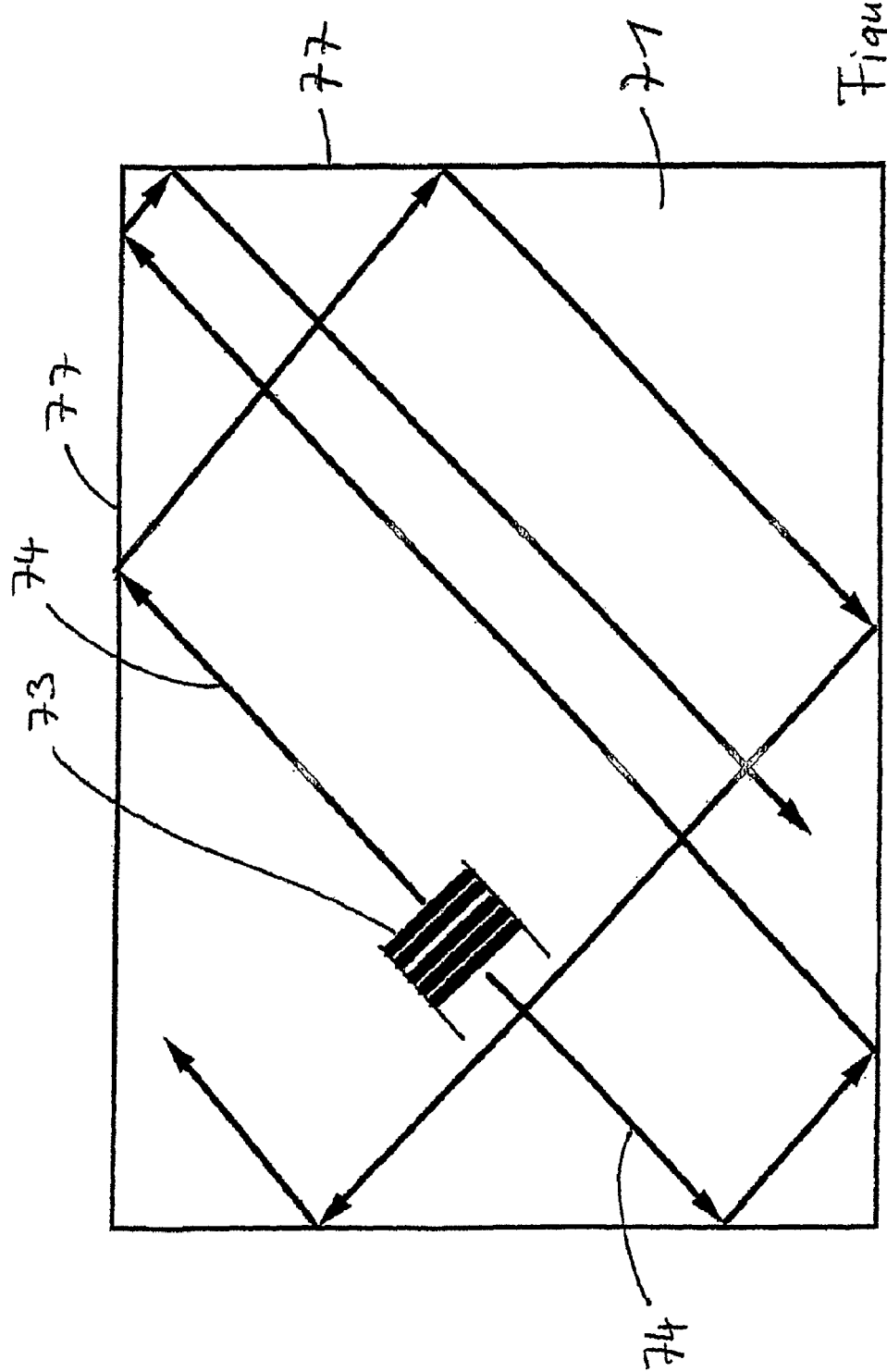

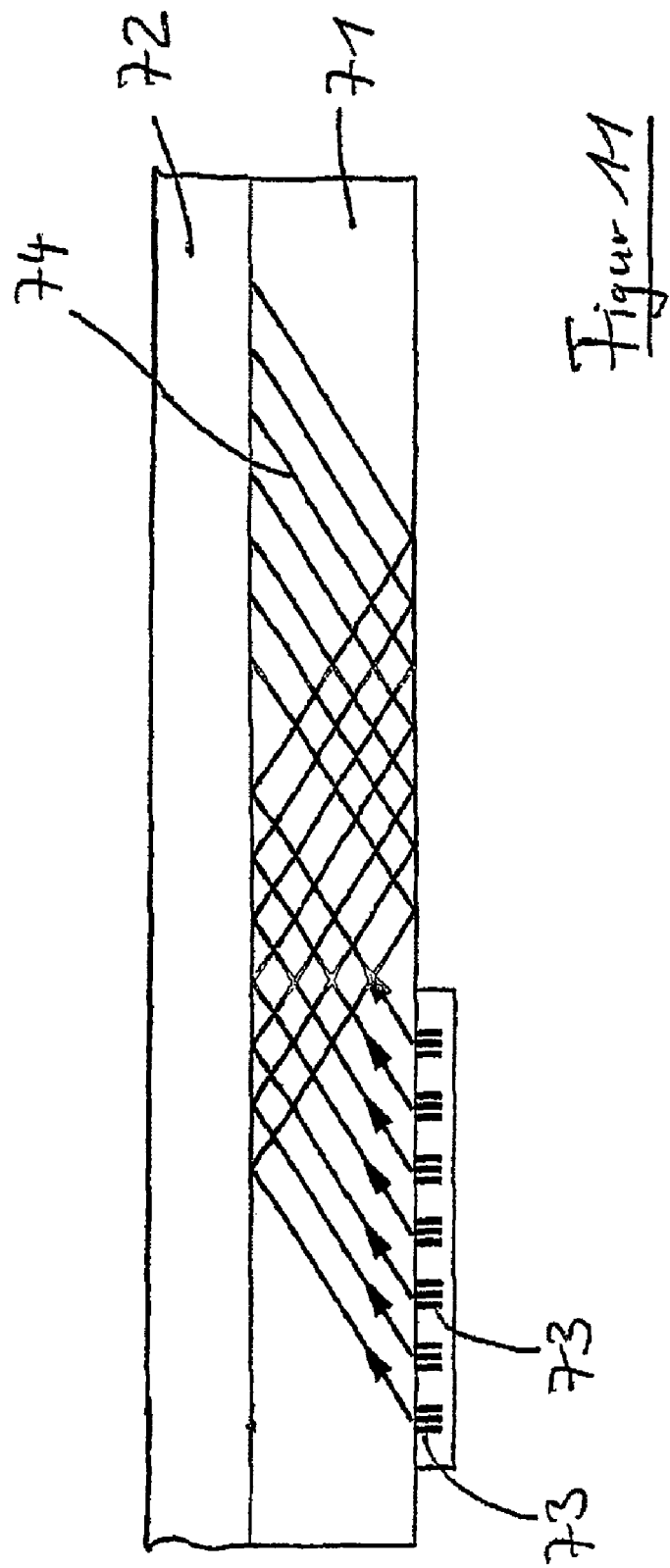

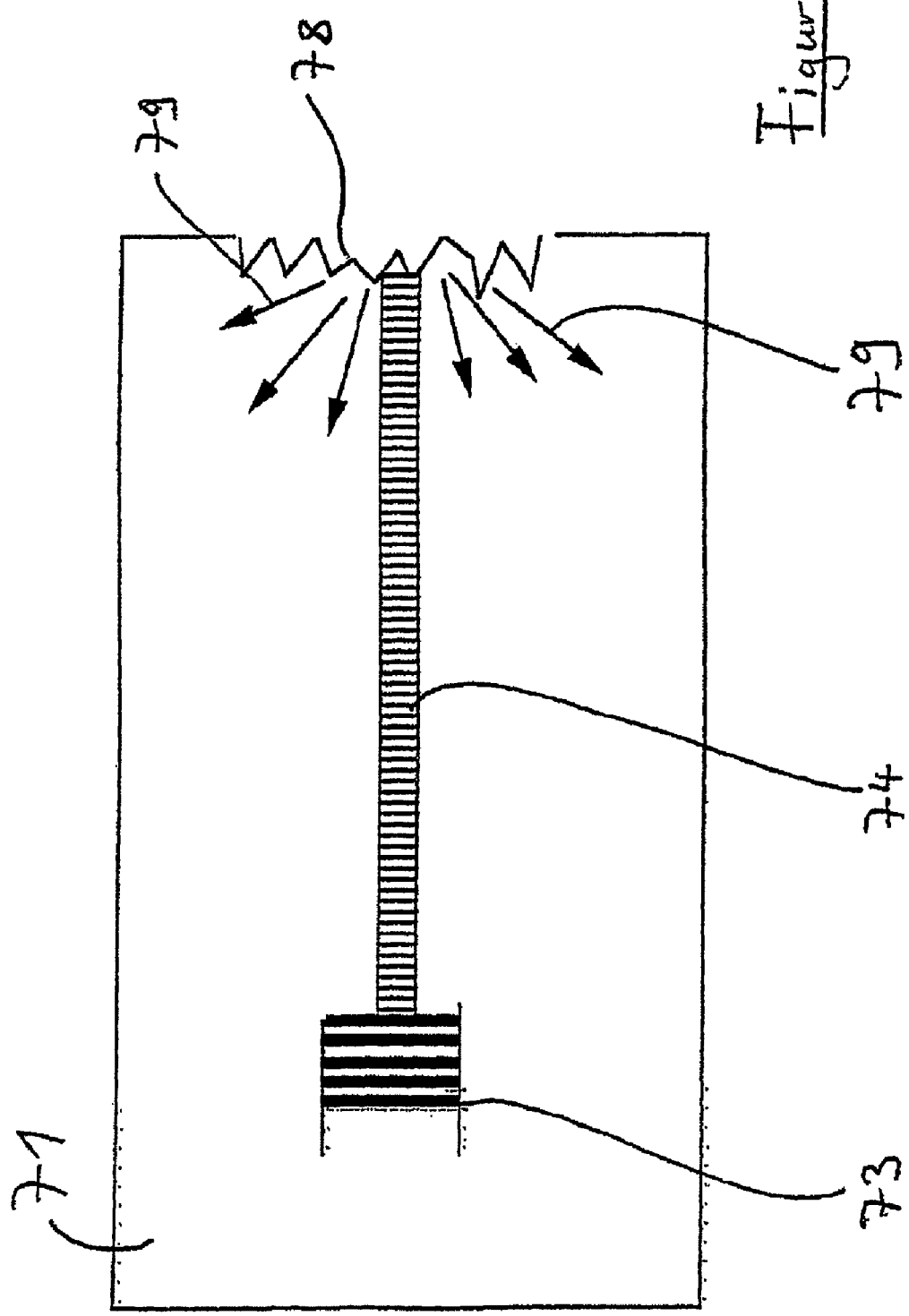

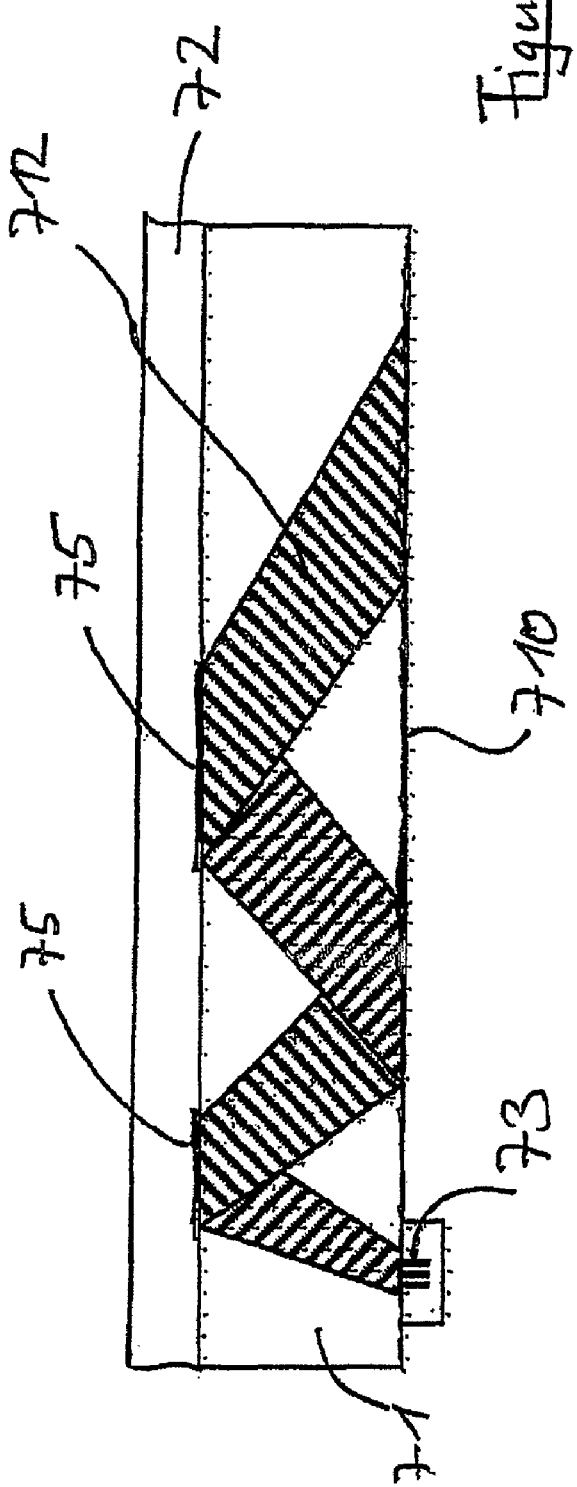

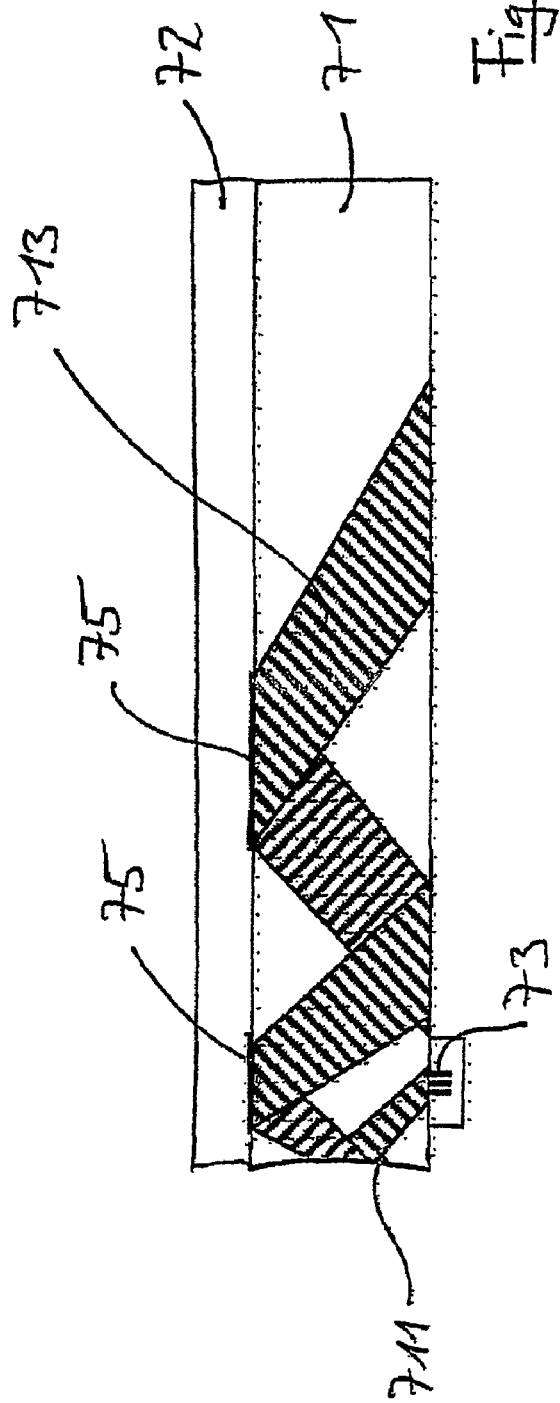
Figur 15

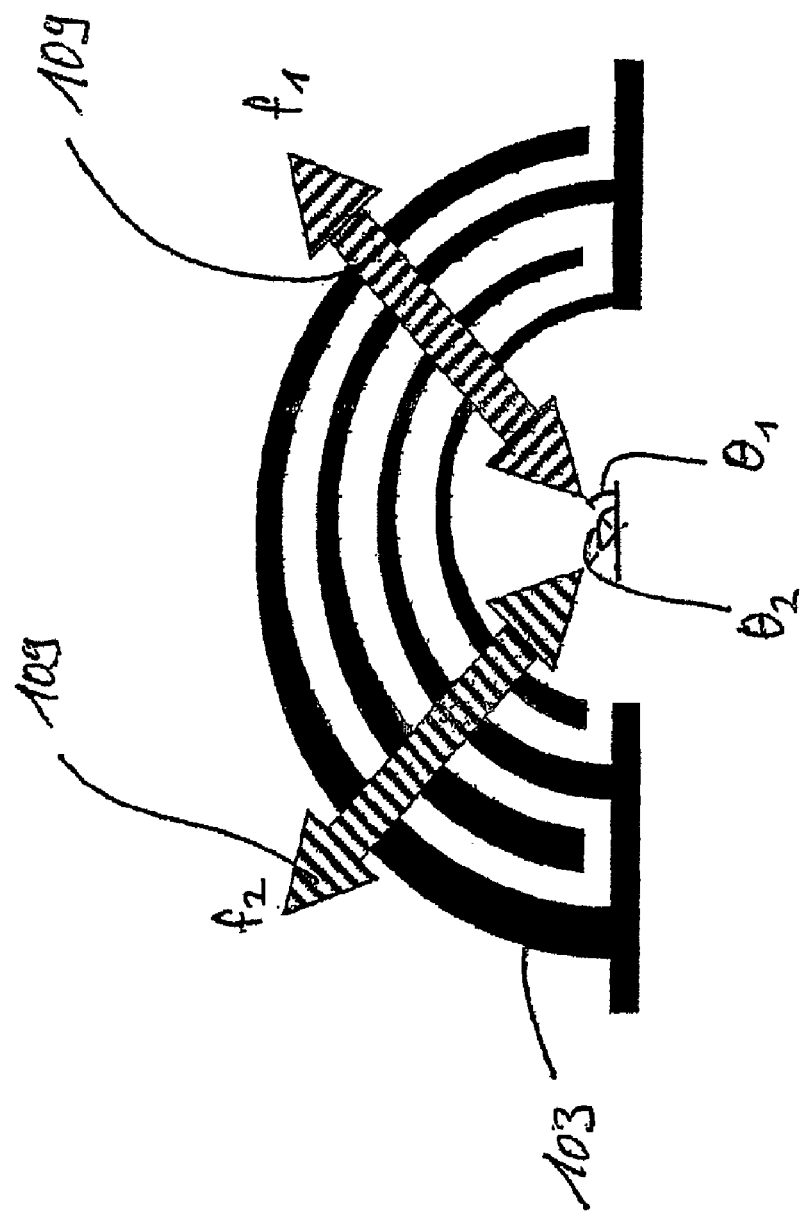

METHOD AND DEVICE FOR GENERATING MOVEMENT IN A THIN LIQUID FILM

CROSS-REFERENCE TO RELATED APPLICATION(S)

The present application is a continuation of U.S. application Ser. No. 10/547,263 filed Jul. 11, 2006 now abandoned and which is a national phase application of PCT/EP04/00688 filed Jan. 27, 2004.

The invention relates to a method for generating motion in a thin liquid film and a device for carrying out the method.

In chemical, biological or microbiological analysis it is often necessary to generate motion in liquid films so as to mix it thoroughly. In this way reactions can for example be forwarded or the liquid can be homogenised.

Such liquid films can be applied for example in microarray experiments for examining macromolecules such as proteins, nucleic acids, antigens or antibodies. A fast method for analysing macromolecules uses microarrays, in which known first, if required different macromolecules are arranged at various points for example in a matrix form on a substrate. These macromolecules are also designated as probe molecules. A liquid with second macromolecules (sample molecules) is sluiced over the microarray, which with at least a type of probe molecules on the microarray a specific can enter into a bond (hybridising). If the liquid is then removed from the surface, the sample molecules to be examined remain only at the sites of specific binding. Locally resolved measuring, for example fluorescence measuring, can be used to ascertain at which sites sample molecules are present. It can therefore be determined from the known position of the individual probe molecules in the matrix form of the microarray, with which type of macromolecules the macromolecules to be examined have entered into a specific bond.

The duration of a corresponding analytical experiment is determined to a considerable extent by the diffusion of the sample molecules to the probe molecules and can therefore take a while. If for example the concentration of the macromolecules to be examined in the liquid is only minimal, then it can last a very long time until it has found its specific bonding partner on the array. Therefore a device, with which the liquid can be thoroughly mixed, is preferred in order to achieve homogeneous distribution of the macromolecules on the microarray at any given time.

Thorough mixing in liquid drops on a surface is described in DE-A-101 17 772. The piezoelectric sound transducer, by means of which surface acoustic waves are generated, comprises for example an interdigital transducer.

Such interdigital transducers are metallic electrodes designed in the manner of combs, whereof the double finger distance defines the wavelength of the surface acoustic wave and which can be produced by the optical photolithography process for example in the range around the 10 μm finger distance. Such interdigital transducers are provided for example on piezoelectric crystals for the purpose of exciting surface acoustic waves in a manner known per se on said crystals.

With this type of known method there is the danger of corrosion of the interdigital transducer by liquid, or the influence of the liquid and reactants possibly contained therein through contact with the interdigital transducer. To avoid such disadvantages the surface of the piezoelectric crystal, on which the interdigital transducer is located and on which the surface acoustic wave is generated, can be provided with a passivation layer. This coating must be removed again on the electrical contact surfaces of the interdigital transducer, necessitating a lithography and etching stage.

The generation of a flow in liquids by means of acoustic waves is described in Wesley Le Mars Nyborg "Acoustic Streaming" in Physical Acoustics 2B; ed. W. P. Mason; Academic Press 265 (1965).

The motion of liquids by means of surface acoustic waves is illustrated in S. Shiokawa et al., IEEE Proceedings of the Ultrasonics Symposium 1989, pages 643 ff.

Finally, it would be desirable if a mixing process could be made available not only for liquid drops, but also for liquid films and which can be used for example also for liquid films in a capillary gap.

The object of the present invention is to provide an improved method and an improved device for generating motion in a thin liquid film, in particular in a capillary gap, which are in addition easy and cost-effective to produce and utilise.

This task is solved by a method having the characteristics of Claim 1 and a device having the characteristics of Claim 15.

The liquid film is separated from the at least one ultrasound generating device by the substrate. A separate passivation or protective layer, which would keep the ultrasound-generating device away from the liquid film, is not required. The method is easy and cost-effective to carry out. The application for liquid films, which are limited by a capillary gap, is particularly advantageous.

With the inventive method therefore a liquid film having a thickness for example of a few micrometers to 5 millimeters can be separated by the substrate from the ultrasound device, for example a piezoelectric sound transducer, which generates acoustic waves in a frequency range of a few MHz to a few 100 MHz. The piezoelectric sound transducer can have a size of a few square millimeters to a few square centimeters and a thickness of a few 10 micrometers to a few millimeters.

By way of advantage the substrate is thinner than a few centimeters, though thicker than ¼ of the ultrasound wavelength. So-called "flexural plate wave modes" or Lamb modes forming in the substrate can therefore effectively be prevented. It can have a surface of a few square millimeters to a few 10 square centimeters.

No coating of a piezoelectric crystal surface with subsequent lithography or etching is necessary in particular for the inventive method. The inventive method enables applications with liquid films on metallised surfaces, which can lead to short circuits for example of the interdigital transducer with the known method.

The surface facing the liquid is a planar substrate surface in the case of the inventive method. Fluidic problems, which result due to various lateral surface characters of the substrate, can be absent. A smooth substrate surface is easier to clean than a heterogeneous surface.

The acoustic wave input in the liquid causes a flow along closed flow lines. The acoustic wave itself is strongly localised in the liquid stark around the input site. The range of the flow depends on the gap thickness and is all the greater the wider the capillary gap is. As a rule the flow rate drops exponentially with the distance from the input site. In the case of a gap height of ca. 200 μm the decrease in the flow rate is to be seen by a factor of 10 pro millimeters distance. In a capillary gap of 100 μm high the performance must be increased ca. By a factor of 10 on the other hand to increase the range by 1 mm, in which homogeneous thorough mixing is achieved.

Yet to ensure homogeneous mixing of a larger liquid film, for example several ultrasound wave-generating devices can be provided to generate several ultrasound waves at different places. However, it is particularly advantageous if ultrasound is input into the liquid film by means of an ultrasound wave-generating device, such that the liquid at least is set in motion at two poles of motion or respectively input sites. A lateral distance of a few 100 μm, preferably several millimeters, is possible for example. Depending on the desired requirement the poles of motion can be arranged such that their working fields overlap or lie further apart.

Two poles of motion or respectively input sites can be received for example by means of an ultrasound wave-generating device, which radiates bidirectionally.

In an embodiment of the invention the ultrasound wave is generated by means of a surface wave-generating device, preferably an interdigital transducer on the side of the substrate facing away from the liquid film.

Using such an interdigital transducer volume acoustic waves can be generated variously in the substrate, which pass through the latter obliquely. The interdigital transducer generates a bidirectionally radiating limit surface wave (LSAW) on the limit surface between the piezoelectric crystal and the substrate, to which it is applied. This limit surface leakage wave radiates energy as volume acoustic waves (BAW) into the substrate. The amplitude of the LSAW decreases exponentially, whereby typical decay lengths are approximately 100 μm. The radiation angle $\alpha$ of the volume acoustic waves in the substrate measured against the normal of the substrate results from the arcussinus of the ratio of the speed of sound $V_s$ of the volume acoustic wave in the substrate and the speed of sound $V_{LSAW}$ of the limit surface acoustic wave ($\alpha=\arcsin(V_s/V_{LSAW})$) created with the interdigital transducer. Radiating in the substrate is therefore only possible if the speed of sound in the substrate is less than the speed of sound of the limit surface leakage wave. As a rule therefore transversal waves are excited in the substrate, because the longitudinal speed of sound in the substrate is greater than the speed of the limit surface leakage wave. A typical value for the limit surface leakage wave speed is for example 3900 m/s.

The piezoelectrically caused deformations under the interdigital transducer fingers engaging in one another in the manner of combs radiate volume acoustic waves (BAW) directly into the substrate. In this case this produces an angle of radiation $\alpha$ measured against the normal of the substrate as arcussinus of the ratio on the one hand to the speed of sound in the substrate $V_s$ and on the other hand to the product from the period of the interdigital transducer $I_{IDT}$ and the applied high frequency f ($\alpha=\arcsin(V_s/(I_{IDT} \cdot f))$). For this sound input mechanism the angle of incidence relative to the normal, the angle of levitation $\alpha$, can therefore be preset by the frequency. Both effects can occur adjacently.

Both mechanisms (LSAW, BAW) enable oblique radiating of the substrate. The entire electrical contacting of the interdigital transducer takes place on the side of the substrate facing away from the liquid film, so that corrosion of the electrical contacting by aggressive liquids is excluded.

The piezoelectric crystal supporting the interdigital transducer can be stuck, pressed or bonded on the substrate or can be stuck, pressed or bonded on the substrate via a coupling medium (for example electrostatically or via a gel film). Likewise the piezoelectric crystal can constitute the substrate itself.

The use of a substrate material, which has a slight acoustic damping at operating frequency, is also particularly advantageous. The volume acoustic wave in the substrate is partly reflected on the limit surface to the gap, and only a fraction of the sound energy enters the liquid. With weaker damping in the substrate the reflected beam can be again input into the gap following further reflection on another substrate surface at another place. In this way the substrate is utilised like a fibre optic to conduct and distribute the volume acoustic wave in the substrate to several places of the gap. At the same time the substrate is selected advantageously such that on the limit surface between substrate and liquid part of the ultrasound energy is decoupled, which serves as motion for the liquid film. On the other limit surface of the substrate the greatest possible reflection should enter. Quartz glass for example has proven particularly suitable at a frequency of 10 MHz to 250 MHz, preferably 100 MHz to 250 MHz, which has almost complete reflection on a limit surface to air, and has approximately 10% to 20% decoupling on the limit surface between substrate and liquid.

Located on the piezoelectric substrate in an embodiment are one or more interdigital transducers for generating the ultrasound waves, which are contacted either separately or are contacted together in series or in parallel to one another, and which can be controlled separately by choice of frequency with varying finger electrode distance.

It is particularly easy to produce homogeneous thorough mixing also by frequency-controlled variation of the input site. This raises the limit of the mixing range, in that the input site and thus active mixing area is pushed around the latter over the surface to be mixed.

The use of interdigital transducers with non-constant finger distance ("tapered interdigital transducer"), as described for another application for example in WO 01/20781 A1, enables selection of the radiation site of the interdigital transducer by means of the applied frequency. In this way it can be ascertained precisely at which place the ultrasound wave is input into the liquid.

By using a tapered interdigital transducer, which additionally has finger electrodes not designed straight, for example finger electrodes engaging in one another in particular curved, the direction of radiation, therefore the azimuthal angle $\theta$ in the limit surface, can be regulated by varying the operating frequency. And on the other hand also the angle of levitation a can be changed with the frequency by direct BAW generation on the interdigital transducer.

It is possible to very precisely determine those parts of the liquid film, which are to be moved by the ultrasound wave, by the frequency dependencies described. Mixing patterns, which are better suited to mixing liquids than stationary flows, can thus be created temporally non-stationary for example through continuous variation of the frequency.

An advantage with the inventive method according to these configurations using interdigital transducers on the side of the substrate facing away from the liquid is the independence of the electrical impedance of the interdigital transducer electrode from the electrical conductivity of the sample and the possibility of being able to use this method on metallicised slide supports. Since the interdigital transducer electrode required to create the acoustic wave is removed through the thickness of the substrate from the metallicised surface and the possibly electrical conductive liquid, no capacitive short circuit can occur, as can happen in the method described in DE-A-101 17 722, and also the impedance of the interdigital transducer electrode is not influenced by the conductivity of the sample solution. Therefore more stable electrical impedance matching to the high-frequency generator electronics is possible than with the previously known method.

In an alternative embodiment a limit surface acoustic wave is generated by means of a surface wave-generating device, preferably an interdigital transducer, on a front surface of the substrate. This produces oblique radiation of a volume acoustic wave in the substrate in the manner described. This volume acoustic wave is likewise input obliquely into the liquid film in contact with a main surface possibly by reflection on the main surfaces.

With the described embodiments ultrasound energy can be input at different places into the liquid film. By suitable selection of geometry, for example the thickness of the substrate, these input sites can be ascertained locally exactly. With such a method several input sites are produced, without a large number of surface wave-generating devices being necessary. Problems, which might arise with wiring or a plurality of surface wave-generating devices, are thus avoided.

Since an interdigital transducer electrode generally sends out two volume acoustic waves in the substrate, two unidirectionally driven surface elements of the same size separated lateral from one another on the limit surface between substrate and liquid film result as flow source with the inventive method, instead of a locally concentrated bidirectionally driven surface element of the size of the interdigital transducer electrode. Accordingly the fluidic effective cross-section, therefore the surface via which an interdigital transducer electrode is fluidically active and which can intermix an interdigital transducer electrode, is clearly enlarged. An additional outcome of this is greater flexibility in the arrangement of the flow sources. For example, the distance of both unidirectionally driven flow sources from one another grows with the thickness of the substrate. Two liquids separated from one another can thus be mixed, for example using an interdigital transducer element.

To prevent reflections occurring in unwanted places the ultrasound wave can be randomly dispersed by appropriate selection of a randomly dispersive front surface of the substrate. To this end at least one surface of the substrate is roughened, for example. This effect can also be utilised for targeted enlargement.

In order to guide the spread of the ultrasound wave in the substrate in preferred directions, correspondingly and angularly arranged reflection surfaces can be provided preferably on the front surfaces not corresponding to the main surfaces. The ultrasound wave can be guided in a predetermined manner with such reflection surfaces.

An inventive device for carrying out an inventive method has a substrate with an ultrasound wave-generating element. A main surface of the substrate is provided for contact with the liquid film. The ultrasound wave-generating device is designed such that the ultrasound wave is input obliquely into the substrate. It is particularly advantageous if the ultrasound wave-generating device is arranged on a main surface of the substrate, which is arranged opposite the liquid film. However it is also conceivable that the ultrasound wave-generating device is arranged on another surface and the ultrasound wave is guided to the liquid film by reflection inside the substrate.

By using a substrate material, which has minimal acoustic damping and corresponding reflection coefficients on the limit surfaces, a device can be provided, in which a greater range of the acoustic beam is achieved as described by reflection on the limit surfaces.

Another inventive device for carrying out an inventive method has a substrate with an ultrasound wave-generating element on a front surface, which is not a main surface. The angle of radiation of the volume acoustic wave generated in the substrate is generated by the speed of sounds inside and outside the substrate. In this way the volume acoustic wave is generated obliquely in the substrate and the part propagating away from the liquid film is reflected at least in part by reflection on the main surface facing away from the liquid film in the direction of the limit surface between substrate and liquid film.

Devices with interdigital transducers of the already above-described geometry can be employed to create the abovementioned effects.

Figure 9A:
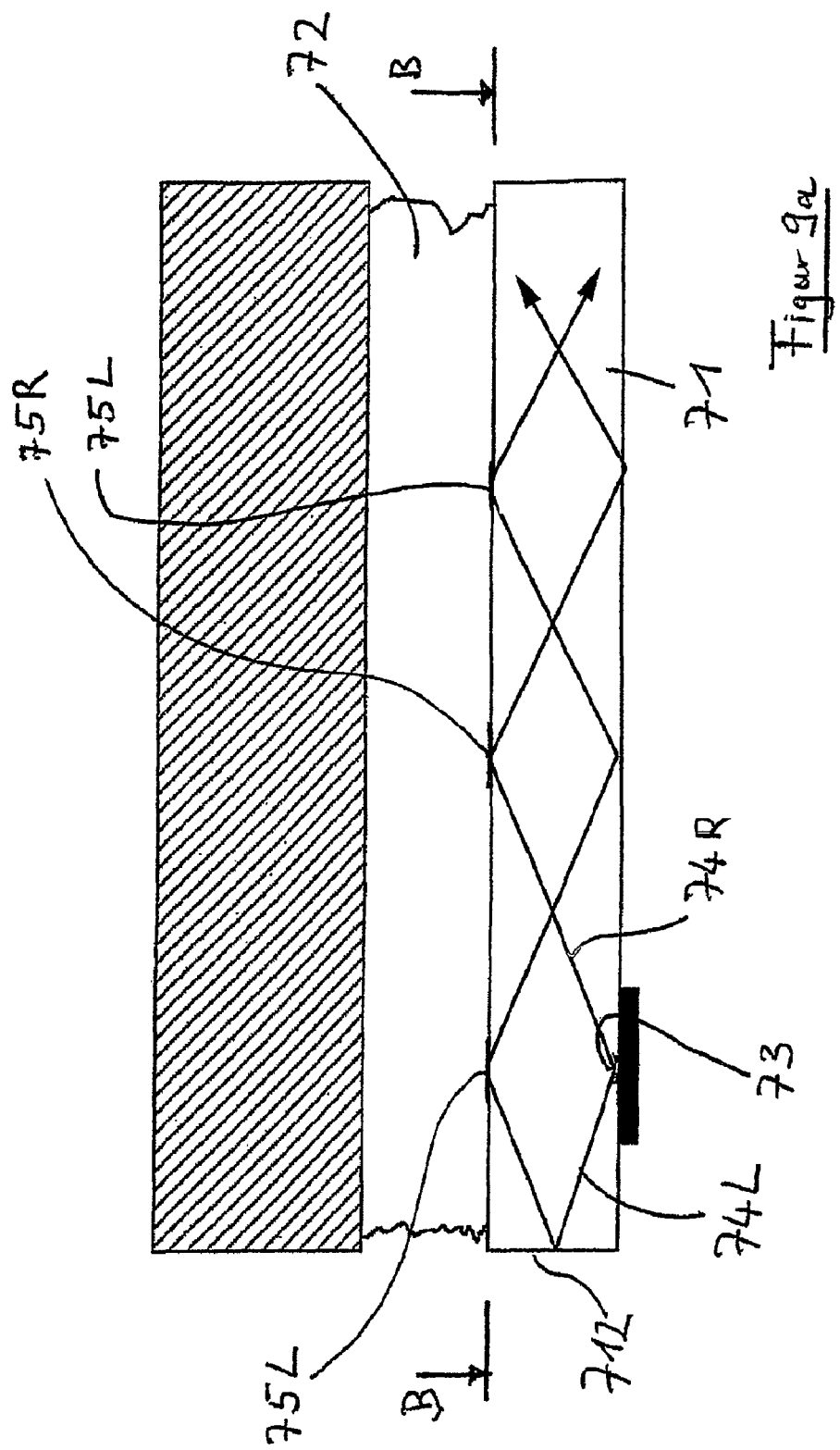
Figure 9B:
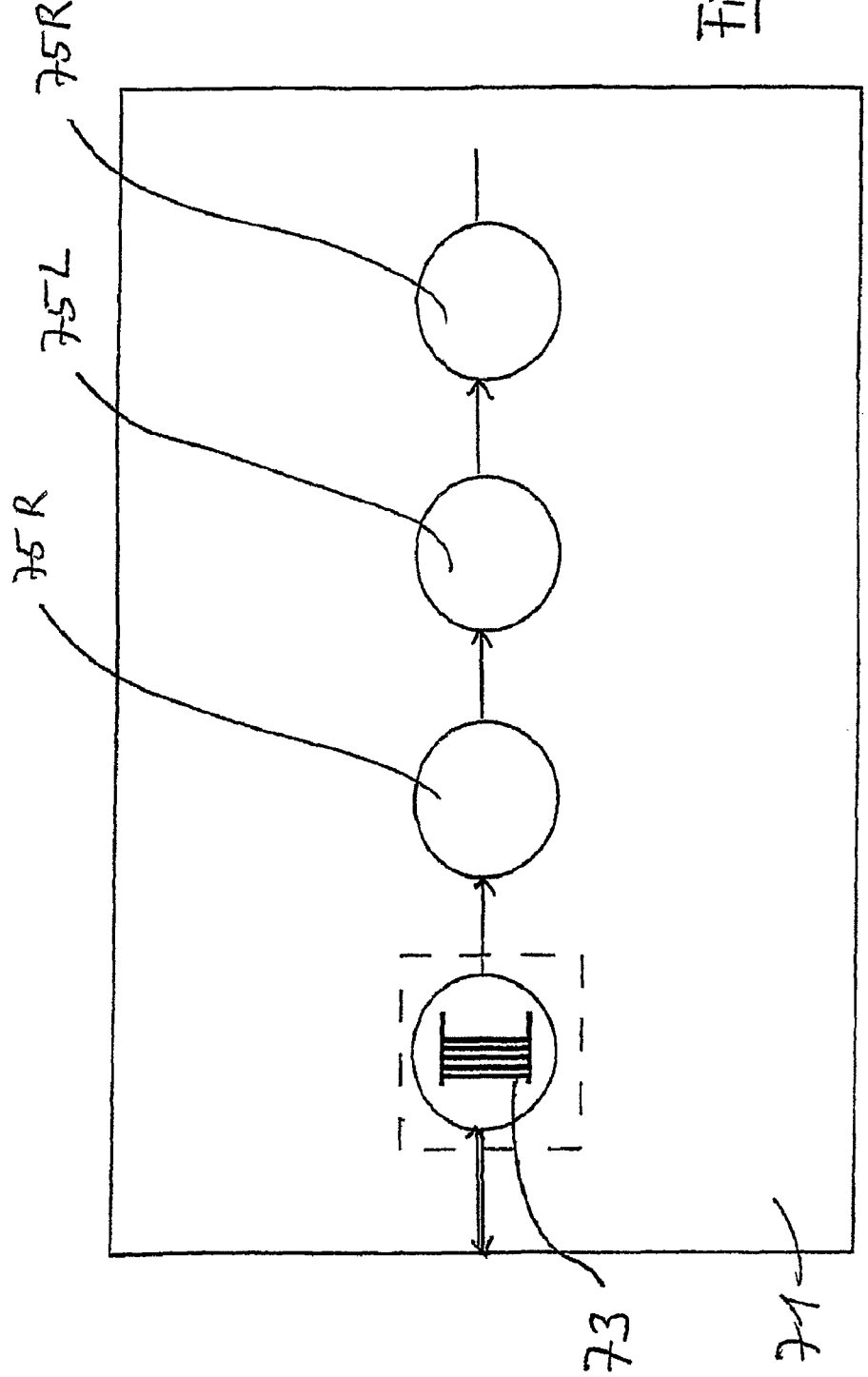
Figure 12:
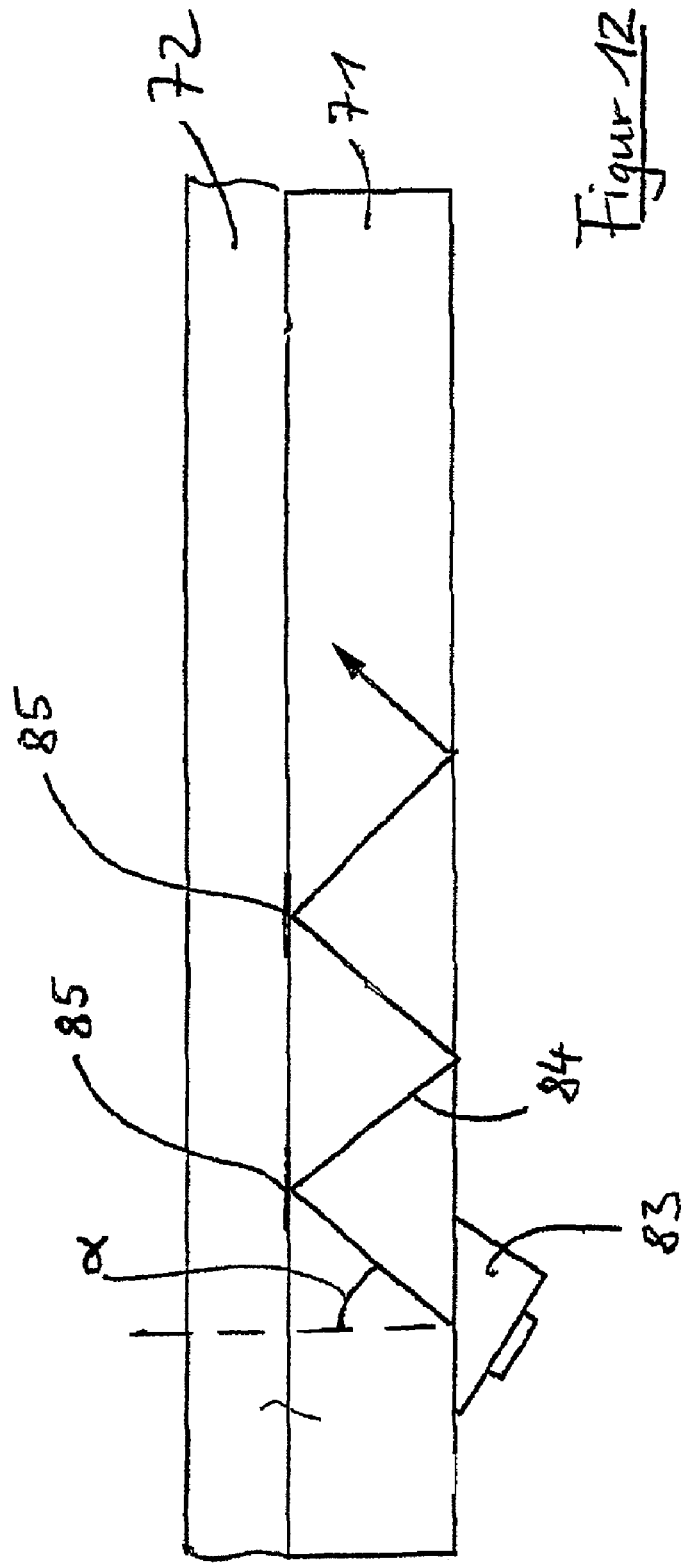

The invention will now be explained in detail by means of the accompanying schematic figures, in which:

FIG. 1a: is a schematic lateral sectional view through an arrangement for carrying out a first design of the inventive method, FIG. 1b: is a schematic lateral sectional view through an arrangement for carrying out a first embodiment of the inventive method, whereby the direction of radiation is indicated for different frequencies, FIG. 2: is a sectional view of the arrangement of FIG. 1 in the direction A, FIG. 3: is a schematic lateral sectional view through an arrangement for carrying out a second embodiment of the inventive method, FIG. 4: is a schematic lateral sectional view through an arrangement for carrying out a third embodiment of the inventive method, FIG. 5: is a schematic lateral sectional view through an arrangement for carrying out a fourth embodiment of the inventive method, FIGS. 6a to 6c: are schematic sectional views of different embodiments of the electrical contacting of a device for carrying out an inventive method, FIG. 7: is a schematic lateral sectional view through an arrangement for carrying out a fifth embodiment of the inventive method, FIG. 8a: is a lateral schematic sectional view through an arrangement for carrying out a sixth embodiment of the inventive method, FIG. 8b: a schematic sectional view in the direction of viewing A of FIG. 8a, FIG. 9a: is a lateral schematic sectional view through an arrangement for carrying out a seventh embodiment of the inventive method, FIG. 9b: is a sectional view in the direction of viewing B of FIG. 9a, FIG. 10a: is a schematic plan view of a cross-section of an arrangement for carrying out an eighth embodiment of the inventive method, FIG. 10b: is a schematic plan view of a cross-section of an arrangement for carrying out a ninth embodiment of the inventive method, FIG. 11: is a schematic illustration of a tenth embodiment of the inventive method, FIG. 12: a schematic illustration of an eleventh embodiment of the inventive method, FIG. 13: is a schematic plan view of a cross-section of an arrangement for carrying out a twelfth embodiment of the inventive method, FIG. 14: is a schematic lateral sectional view through an arrangement for carrying out a thirteenth embodiment of the inventive method, FIG. 15: is a schematic lateral sectional view through an arrangement for carrying out a fourteenth embodiment of the inventive method, and FIG. 16: is a schematic plan view of a cross-section of an arrangement for carrying out a fifteenth embodiment of the inventive method.

In FIG. 1a reference numeral 1 designates a substrate, for example glass. Use of a slide support is feasible, for example. Reference numeral 5 is a piezoelectric crystal element, for example made of lithium niobate. Positioned between the piezoelectric crystal element 5 and the glass body 1 is an interdigital transducer 3, which was applied for example previously to the piezoelectric crystal 5. An interdigital transducer is generally made up of metallic electrodes engaging in one another in the manner of combs, whereof the double finger distance defines the wavelength of a surface acoustic wave, which are excited by applying a high-frequency alternating field (in the range of for example a few MHz to a few 100 MHz) to the interdigital transducer in the piezoelectric crystal. For the purposes of the present text the term "surface acoustic wave" is also understood to refer to limit surface waves on the limit surface between piezoelectric element 5 and substrate 1. Such interdigital transducers are described in DE-A-101 17 772 and known from surface wave filter technology. Metallic supply lines 16, which lead to a high-frequency source not illustrated here, serve to connect the electrodes of the interdigital transducer.

The substrate 1 is mounted by way of spacers 13 on a further substrate 11, for example likewise a slide support made of glass. The spacers can be separate elements or can be formed integrally with one of the substrates 1, 11.

In between the substrates 1 and 11 is a liquid film 7, to be mixed. The capillary gap, in which the liquid 7 is located, is a few micrometers, for example 30 to a few 100 micrometers. Positioned on the substrate 11, for example a slide support, can be for example a microarray, which has spots in a regular arrangement, to which different macromolecules are bound. In the liquid 7 for example other macromolecules are present, whereof the reaction properties are to be examined with the macromolecules of the microarray.

An embodiment is shown, in which the ultrasound wave-generating device is arranged on the side of the substrate 1 opposite the liquid film. It is understood that in both this and in the following embodiments the ultrasound wave-generating device can also be arranged on the side of the other substrate 11 opposite the liquid film.

By means of the interdigital transducer ultrasound waves 9 can be generated in the given direction, which pass through the substrate 1 at an angle α to the normal of the substrate 1 as volume acoustic wave, as described hereinabove. Reference numeral 15 schematically indicates those areas of the limit surface between liquid 7 and substrate 1, which are essentially affected by the volume acoustic wave 9.

If float glass of for example 2 mm in thickness is used as substrate material the exit points 15 of the acoustic wave in the liquid are at a distance of ca. 8 mm and are arranged symmetrically to the sound source. If the interdigital transducer is operated at a high-frequency output of 500 mW, the range is then approximately 5 mm, in this case adequate for thorough mixing a liquid in a capillary gap over a microarray on the substrate 11 of a surface of 0.8 to 1.25 cm$^2$.

FIG. 1b assists in explaining to point out, how different input angles can be set with an embodiment of FIG. 1a by selecting different frequencies.

FIG. 2 shows a sectional view in the direction of viewing A according to the indication in FIG. 1.

FIG. 3 shows an alternative structural form. Here the interdigital transducer is bound on the piezoelectric crystal 5 to a side surface of the substrate 1. Once again a volume acoustic wave 9 is introduced at an angle into the substrate 1, whenever high-frequency voltage is applied to the interdigital transducer. The electrodes necessary for this are not illustrated separately in FIG. 3 for the sake of clarity. The part of the volume acoustic wave radiated in the direction of the capillary gap with the liquid 7 directly reaches the limit surface between substrate 1 and liquid film 7. The volume acoustic wave radiated upwards in FIG. 3 is at least reflected partially on the surface of the substrate 1 in the direction of 17 and reaches the limit surface between liquid film 7 and substrate 1 at another place.

FIG. 4 shows an embodiment, in which the interdigital transducer 3 is arranged not on the limit surface between substrate 1 and the piezoelectric crystal 5, but on the side of the piezoelectric crystal 5 facing away from the substrate 1. By applying a high-frequency field of suitable frequency to the interdigital transducer 3 a volume acoustic wave can be generated in the piezoelectric crystal 5, which is input into the substrate on the side of the piezoelectric crystal 5 facing away from the interdigital transducer 3. The angle of incidence α of the acoustic wave to the limit surface normal in the substrate 1 then results from the angle of incidence β of the acoustic wave to the limit surface normal in the piezoelectric crystal 5 and the ratio of the speed of sound in the piezoelectric substrate $v_p$ to that in the substrate $v_s$ according to the formula $\alpha = \arcsin[(v_s/v_p) \times \sin \beta]$.

It is also possible, by applying a high-frequency field of suitable frequency to the interdigital transducer 3 on the piezoelectric crystal 5, to generate a surface acoustic wave, which is converted into a volume acoustic wave in the piezoelectric crystal 5 after brief propagation by means of structures (etched in periodic trenches, damped periodic metal strips) produced on the surface.

FIG. 5 shows an embodiment, in which the piezoelectric crystal 5 is connected to the interdigital transducer 3 via a coupling medium 19 for secure and full-surface coupling with the substrate 1. Water, for example, is considered as a coupling medium. The coupling medium can raise the efficiency of the sound generation in the substrate 1 by being appropriately designed (thickness, material). A thin interaction layer influences the angle α only negligibly. Such a coupling medium can be made use of in all configurations.

The electrical contacting of the interdigital transducer electrode in the embodiments of FIGS. 1, 2, 3 and 5 is schematically illustrated in FIG. 6 in three different embodiments. In the embodiment, as illustrated in FIG. 6a, metallic strip conductors are applied to the substrate (to the rear side or for the embodiment of FIG. 3 on the front side). The piezoelectric sound transducer 5 is placed on the substrate such that an overlap of the metallic electrode on the substrate with an electrode of the interdigital transducer on the piezoelectric sound transducer results. When the piezoelectric sound transducer is adhered to the substrate electrically conductive adhesive is stuck in the overlap region, whereas the remaining surface is adhered with conventional non-electrically conductive adhesive. In the case of the embodiment illustrated in FIG. 5 purely mechanical contact suffices. The electrical contacting 22 of the metallic strip conductors on the substrate in the direction of the high-frequency generator electronics is made by soldering, adhesive connection or a spring-loaded contact pin.

In the embodiment of electrical contacting, as is illustrated in FIG. 6b, the piezoelectric sound transducer 5, on which the interdigital transducer electrode is applied with supply lines 16, is applied to the substrate 1 such that a projection from the first to the second results. In this case the contacting 22 applied directly on the electrical supply lines 16 is applied to the piezoelectric sound transducer. The contact can be made by soldering, adhesive, bonding or by means of a spring-loaded pin.

In the embodiment of electrical contacting, as is illustrated in FIG. 6c, and which for example is possible for the embodiments of FIGS. 1, 2, and 5, the substrate 1 is provided with one hole 23 for each electrical contact and the piezoelectric sound transducer 5 is placed on the substrate 1 such that the electrical supply lines applied to the piezoelectric sound transducer can be contacted through the holes 23. The electrical contact in this case can take place via a spring-loaded pin directly on the electrical supply lines on the piezoelectric sound transducer 5. There is a further possibility of filling the hole with a conductive adhesive 23 or to stick on a metallic bolt. Further contacting 22 in the direction of the high-frequency generator electronics then happens by way of soldering, an additional adhesive connection or a spring-loaded pin.

A further possibility for supplying the electrical power to the piezoelectric sound transducer is inductive input. At the same time the electrical supply lines to the interdigital transducer electrodes are configured such that they act as an antenna for contactless control of the high-frequency signal. In the simplest case this is an annular electrode on the piezoelectric sound transducer, which acts as a secondary circuit of a high-frequency transformer, whereof the primary circuit is connected to the high-frequency generator electronics. This is held externally and is arranged directly adjacent to the piezoelectric sound transducer.

FIG. 7 shows the use of a piezoelectric volume oscillator, for example a piezoelectric thickness oscillator 30, arranged such that oblique input of a acoustic wave occurs. For this purpose a so-called wedge transducer is employed, which is connected to with a high-frequency source 31. The angle of incidence α to the surface normal of the surface, to which the wedge transducer was attached, is determined from the angle β, at which it is attached, and the ratio of the speed of sound of the wedge transducer $v_w$ and of the substrate $v_s$ according to $\alpha = \arcsin[(v_s/v_w) \times \sin \beta]$.

In the extreme case of such an arrangement the angle β can also be 90°. Then the acoustic modulator 300 is arranged on a front surface of the substrate 1. This arrangement of the acoustic modulator 300 is indicated in FIG. 7 in dashed lines.

Not illustrated in FIG. 7 are spacers, located between the substrate 1 and the second substrate 11 for creating the capillary gap, in which the liquid 7 is kept. Both in this embodiment and also in the embodiments of FIGS. 1 to 5 such a microarray can be located on the substrate 1 or the substrate 11.

In FIG. 7 a microarray 21 is also indicated, in order to illustrate one of the possible applications of a mixing device or respectively the mixing method. The microarray 21 comprises spots in a regular arrangement, for example in matrix form, which are functionalised to react for example with macromolecules in the liquid 7.

The described inventive devices can be used with an inventive method as follows.

For carrying out an inventive method it suffices for the piezoelectric element 5 to be pressed firmly onto the substrate 1. The substrate 11 can be provided with a microarray, for example.

A substrate 1 with a surface acoustic wave-generating device is set thereon by way of spacers 13, as is shown in FIGS. 1 to 4. The liquid 7 can be supplied to the capillary gap through openings, not shown separately. The liquid spreads out in the gap on account of capillary attraction substantially automatically. Alternatively, the liquid can also previously to applied to the substrate 11. Applying an electrical high-frequency field to the interdigital transducer 3 creates limit surface acoustic waves on the limit surface between the piezoelectric crystal 5 and the substrate, leading to excitation of volume acoustic waves 9 in the substrate 1. The volume acoustic wave 9 spreads out in the substrate 1 in the directions indicated in FIGS. 1 to 4. And if necessary, reflection on a limit surface for deflecting in the direction of 17, as happens in an arrangement in FIG. 3, occurs at least partially. Somewhere around the regions 15 the volume acoustic wave 9, 17 encounters the limit surface between liquid 7 and substrate 1. The volume acoustic wave transfers an impulse to the liquid or respectively material situated therein and leads to motion in the liquid, resulting in homogenising or respectively thorough mixing of the liquid. In this it is ensured for example that the molecules present in a liquid come into contact with the individual measuring points of the microarray faster than might be the case in a purely diffusion-driven process. FIG. 1b shows how a device of FIG. 1a can be used in direct excitement of volume modes to adjust the site of input in the liquid film by variation of the excitation frequency. The interdigital transducer can be a simple normal interdigital transducer, whereby the angle of levitation α is set according to the interrelationship $\sin \alpha = v_s/(I_{IDT} \cdot f)$, whereby $v_s$ is the speed of sound of the ultrasound wave, f is the frequency and $I_{IDT}$ is the periodicity of the interdigital transducer electrodes. Through variation of the frequency therefore the input angle can be changed for example from α to α'. Through variation of the angle of levitation α, α' on the other hand the input site 15, 15' in the liquid film can be varied.

In an embodiment of FIG. 5 the substrate 1, the liquid 7 and the substrate 11 are first prepared in the described manner. Only then is the piezoelectric crystal 5 with the interdigital transducer 3 put down via the coupling medium 19. Then a high-frequency field is applied to the interdigital transducer 3 as described so as to generate a volume wave 9 in the substrate 1.

In an embodiment of FIG. 7 the microarray 21 is situated by way of example on the substrate 1. Applying a high-frequency field to the piezoelectric acoustic modulator 30 creates an oblique volume acoustic wave in the substrate 1, which encounters the limit surface between liquid film 7 and substrate 1. There, as well as with reference to the embodiments of FIGS. 1 and 4 described, an pulse transfer to the liquid film 7 or respectively the material contained therein takes place, resulting in thorough mixing or respectively homogenising.

Further inventive arrangements are described hereinafter.

FIG. 8 shows an embodiment, in which a substrate 71 is used, which has slight acoustic damping for the ultrasound frequencies used. By way of example, quartz glass, preferably 100 MHz to 250 MHz, can be used for frequencies in the range of 10 MHz to 250 MHz. As explained already with reference to FIG. 1, by means of the interdigital transducer 73 a volume acoustic wave 74 is generated running obliquely in the substrate. At the points 75 the latter encounters the limit surface between substrate 71 and liquid 72. Appropriate choice of the substrate material 71 ensures that a part of the ultrasound wave 74 is reflected at the points 75 or respectively 76, and another part is decoupled. At the same time it has been shown that a partial reflection takes place on the limit surface between substrate 71 and liquid 72, on the limit surface between substrate 71 and air, therefore an almost complete reflection occurs at the points 76. For example there is a reflection factor on the limit surface between liquid and glass of ca. 80% to 90%, using $SiO_2$ glass, therefore input in the liquid film of ca. 10% to 20%. Assuming a reflection factor of 80% the intensity of the beam reflected repeatedly in the glass substrate after 10 reflections decreases ca. by 10 dB. At the same time and with a substrate thickness of 1 mm the beam has already covered a lateral distance of 80 mm. Liquids above a larger microarray, for example 4×1.25 $cm^2$, with such geometry can also be mixed homogeneously.

Through appropriate selection of the geometry, for example the thickness of the substrate, in this way the points 75, at which a part of the ultrasound wave is input from the substrate 71 into the liquid 72, can be determined locally precisely, and in this way a desired pattern of motion can be generated in the liquid 72.

By using suitable modulation of the ultrasound output, for example by switching the interdigital transducer 73 off and on, a current can be generated in this way, which is suited to move the fluid in one direction. With the arrangement of FIG. 8 a flow in a fluid can be induced along the illustrated direction of sound in the direction of 711 in this way for example, by means of which a dye can be moved in ca. 100 seconds over a stretch of 40 mm in the fluid. With conventional arrangements several hours would be required for fluid transport in such a capillary gap. This is indicated in FIG. 8b in the direction of viewing A.

FIG. 9 shows a variation of the arrangement of FIG. 8. In FIG. 9a a lateral sectional view is shown. A beam 74L goes from the bidirectionally radiated interdigital transducer 73 to the left in FIG. 9 and a beam 74R goes obliquely to the right in the substrate 71. At the edge 712 of the substrate 71 the acoustic beam 74L is reflected and deflected in the direction of the limit surface between substrate 71 and liquid 72. At the point 75L it encounters the limit surface for the first time. The acoustic beam 74R encounters the limit surface at point 75R. In this way the density of the input points can be increased. This is schematically illustrated once again in FIG. 9b in the direction of viewing B of FIG. 9a.

FIG. 10a shows a plan view of a cross-section of an arrangement, approximately at the level of the limit surface between liquid 72 and substrate 71, which enables particular deflection of the acoustic beam in the substrate 71. Acoustic beams 74, which encounter the limit surface between the liquid and the substrate 71 at points 75, go out from the interdigital transducer 73 such as described with reference to FIG. 8a. The thus guided acoustic beam 74 is deflected at limit surfaces 77 of the substrate 71 such that it runs into the region of the capillary gap again and is again available to propel a current in the fluid. In the illustration of the figure the beam therefore is guided not recognizably through the substrate 71 in the form of a zigzag line similar to the sectional illustration in FIG. 8a. The induced current pattern can be influenced in the liquid film by suitable geometry of the surfaces 77. Using a reflective geometry similar to that shown in FIG. 10a it is for example possible to thoroughly and homogeneously mix a liquid film on a microarray of a surface of 4×1.25 cm$^2$ with a high-frequency output of only 50 mW.

In FIG. 10b an arrangement is illustrated, enabling a flat substrate to be covered almost completely by means of only one bidirectionally radiating interdigital transducer 73, whereby this is achieved by means of multiple reflection on the lateral faces 77 of the substrate 71. In FIG. 10b the reflection points on the main surface of the substrate 71 are not shown for the sake of clarity, but only the direction of propagation of the ultrasound waves 74, which is caused by reflections on the main surfaces of the substrate 71, such as described for example in reference to FIG. 8a.

FIG. 11 shows an arrangement as a lateral elevation, in which the beam cross-section is effectively broadened, by several interdigital transducers 73 being employed to generate parallel beam bundles 74. In this way sound can be input into the liquid 72 of the capillary gap more homogeneously, which is beneficial for a long-range fluidic flow in the capillary gap, in which fluids are to be transported over vast distances.

The described reflection effect via selection of a suitable substrate material can likewise be generated by means of a volume oscillator 83, as shown in FIG. 12. The oblique input at the angle α takes place as described with reference to FIG. 7. The acoustic exit points for the acoustic beam 84 from the substrate 71 into the liquid 72 are designated in FIG. 12 by reference numeral 85.

FIG. 13 shows an embodiment, in which an edge 78 of the substrate 71 is roughened, so as to generate a diffuse reflection of the incident acoustic wave 74. This can be useful in order to render ineffective an unwanted acoustic beam reflected at an edge. Once again, in FIG. 13 only the entire direction of propagation of the beam 74 is indicated which is caused by the reflection of the acoustic wave on the main surfaces of the substrate 71.

FIG. 14 shows an embodiment, in which the rear face 710 of the substrate 71 is roughened. Located on this rear face is the interdigital transducer 73. In the case of the described inputting of the ultrasound wave in the substrate 71 the beam 712 is widened by diffraction due to the roughened surface. This effect is strengthened further still in further reflections on the surface 710. The input point is correspondingly widened as the distance of the input points 75 from the substrate 71 in the liquid 72 grows.

A similar effect is achievable with an embodiment of FIG. 15. Here the widening of the acoustic beam 713 following input by the interdigital transducer 73 in the substrate 71 is achieved by reflection on an arched reflection edge 711. Just as widening is described here, focusing by means of a correspondingly configured reflection edge can also be achieved.

FIG. 16 shows a further embodiment in a schematic illustration. As in the other illustrations here, too, only a few fingers of the interdigital transducer 103 engaging in one another are shown for the sake of clarity, although an embodied interdigital transducer has a greater number of finger electrodes. The distance of the individual finger electrodes from the interdigital transducer 103 is not constant. At a stored high frequency the interdigital transducer 103 therefore radiates only at one place, in which the finger distance correlates correspondingly with the frequency, as is described for another application, for example in WO 01/20781 A1.

In the embodiment of FIG. 16 the finger electrodes are in addition not straight, but curved. Since the interdigital transducer radiates substantially vertically to the alignment of the fingers, the direction of the radiated surface acoustic wave can be controlled azimuthally in this way by selection of the stored high frequency. In FIG. 16 the direction of radiation 109 for two frequencies f1 and f2 are shown by way of example, whereby with the frequency f1 the direction of radiation is given by the angle $\theta_1$ and for the frequency f2 by the angle $\theta_2$. FIG. 16 schematically shows the plan view of the limit surface between the piezoelectric substrate, on which the interdigital transducer 103 is arranged, and the substrate, which separates the interdigital transducer from the liquid film, which is to be moved, similarly for example to the cross-section A-A, as specified for the embodiment of FIG. 1 in FIG. 1.

Individual embodiments of the method or respectively the features of the described embodiments can also be combined in suitable form also so that the targeted effects can be achieved at the same time.

The invention claimed is:

1. A method for generating motion in a thin liquid film in contact with a substrate comprising a first surface disposed to contact the thin liquid film, the method comprising inducing at least one ultrasound wave within the substrate using at least one interdigital transducer positioned on a piezoelectric element arranged on a surface of the substrate not in contact with the thin liquid film, wherein the thickness of the substrate is at least ¼ of the wavelength of the ultrasound wave within the substrate, and the device is configured to direct the at least one ultrasound wave to a first mixing region spatially separated from a second mixing region in the thin liquid film.

2. The method for generating motion in a thin liquid film as claimed in claim 1, in which the at least one ultrasound wave passes through the substrate obliquely to the plane of the liquid film.

3. The method for generating motion in a thin liquid film as claimed in claim 2, wherein the at least one interdigital transducer radiates bidirectionally.

4. The method for generating motion in a thin liquid film as claimed in claim 1, in which an ultrasound wave is induced within the substrate such that it is reflected at least once inside the substrate.

5. The method as claimed in claim 1, in which the first and second mixing regions are created by a time variation of the direction of radiation ($\alpha$, $\alpha'$, $\theta$, $\theta'$) of the at least one ultrasound generating device.

6. The method for generating motion in a thin liquid film as claimed in claim 1, wherein finger electrodes of the interdigital transducer have no spatially constant distance from one another.

7. The method for generating motion in a thin liquid film as claimed in claim 6, wherein the finger electrodes of the interdigital transducer are curved.

8. The method for generating motion in a thin liquid film as claimed in claim 1, in which a substrate has at least one diffusing surface, to broaden the at least one ultrasound wave in the substrate.

9. The method for generating motion in a thin liquid film as claimed in claim 1, wherein the substrate comprises at least one reflection surface.

10. The method for generating motion in a thin liquid film as claimed in claim 1, whereby the liquid film has thickness of 5 μm to 100 μm.

11. The method for generating motion in a thin liquid film as claimed in claim 1, in which the ultrasound wave has frequency in a range of a few MHz to a few 100 MHz.

12. The method for generating motion in a thin liquid film as claimed in claim 1, wherein the at least one ultrasound wave is induced within the substrate in a radiation angle measured against the normal of the substrate, calculated according to the formula $$\alpha=\arcsin(V_s/V_{LSAW}),$$

wherein $\alpha$ is the radiation angle, $V_s$ denotes speed of sound in the substrate and $V_{LSAW}$ denotes speed of a bidirectionally radiating limit surface wave generated by the interdigital transducer.

13. A device for generating motion in a thin liquid film, comprising
a substrate comprising a first surface disposed to contact the thin liquid film, and
at least one interdigital transducer positioned on a piezoelectric element, the piezoelectric element arranged on a surface of the substrate not in contact with the thin liquid film, the interdigital transducer being configured such that at least one ultrasound wave is input into the substrate,
wherein the thickness of the substrate is at least ¼ of the wavelength of the ultrasound wave within the substrate, and the device is configured to direct the at least one ultrasound wave to a first mixing region spatially separated from a second mixing region in the thin liquid film.

14. The device for generating motion in a thin liquid film as claimed in claim 13, wherein the at least one interdigital transducer is configured to generate a frequency of a few Mhz to a few 100 MHz.

15. The device as claimed in claim 13, wherein the at least one interdigital transducer radiates bidirectionally.

16. The device for generating motion in a thin liquid film as claimed in claim 13, in which an electrical terminal of the at least one interdigital transducer is formed by a first supply line on the piezoelectric element and a second supply line on the substrate, which are arranged such that the first and second supply lines overlap one another.

17. The device for generating motion in a thin liquid film as claimed in claim 13, wherein the piezoelectric element has a projection over the substrate, on which is located a contact point for the electrical supply line to the at least one interdigital transducer.

18. The device for generating motion in a thin liquid film as claimed in claim 13, wherein the at least one interdigital transducer is contacted through a hole via the substrate.

19. The device for generating motion in a thin liquid film as claimed in claim 13, in which the interdigital transducer has antenna mechanisms, which can be used for contactless coupling of a high-frequency signal.

20. The device for generating motion in a thin liquid film as claimed in claim 13, wherein finger electrodes of the interdigital transducer have no spatially constant distance from one another.

21. The device for generating motion in a thin liquid film as claimed in claim 20, wherein the finger electrodes of the interdigital transducer are curved.

22. The device for generating motion in a thin liquid film as claimed in claim 13, wherein the substrate has at least one diffusive surface.

23. The device for generating motion in a thin liquid film (7) as claimed in claim 13, wherein the at least one interdigital transducer is configured such that at least one ultrasound wave is input into the substrate in a radiation angle measured against the normal of the substrate, calculated according to the formula $$\alpha=\arcsin(V_s/V_{LSAW}),$$

wherein $\alpha$ is the radiation angle, $V_s$ denotes speed of sound in the substrate and $V_{LSAW}$ denotes speed of a bidirectionally radiating limit surface wave generated by the interdigital transducer.

24. The device of claim 13, wherein the at least one interdigital transducer is disposed on a second surface opposing the first surface of the substrate and an electrode spacing of the at least one interdigital transducer is configured to direct the at least one ultrasound wave to the first mixing region and the second mixing region in the thin liquid film.

25. The device of claim 13, wherein the at least one interdigital transducer is disposed on a second surface opposing the first surface of the substrate and an applied frequency to the at least one interdigital transducer is configured to direct the at least one ultrasound wave to the first mixing region and the second mixing region in the thin liquid film.

26. The device of claim 13, wherein the at least one interdigital transducer is disposed on a second surface opposing the first surface of the substrate and the substrate comprises a thickness configured to direct the at least one ultrasound wave to the first mixing region and the second mixing region in the thin liquid film.

27. The device of claim 13, wherein the at least one interdigital transducer is disposed on a second surface opposing the first surface of the substrate and the device is further configured to direct the at least one ultrasound wave to a third mixing region and a fourth mixing region in the thin liquid film.

28. The device of claim 13, wherein the at least one interdigital transducer is disposed on a second surface oriented perpendicular to the first surface of the substrate and is configured to radiate bidirectionally such that a first ultrasound wave is directed to the first mixing region and second ultrasound wave reflects off a second surface opposing the first surface of the substrate and is directed to the second mixing region.

29. The device of claim 13, wherein the at least one interdigital transducer is disposed on a second surface opposing the first surface of the substrate and is configured to radiate bidirectionally such that a first ultrasound wave is directed to the first mixing region and reflects off the first surface and the second surface and is directed to the second mixing region.

30. The device of claim 13, wherein the at least one interdigital transducer is disposed on a second surface opposing the first surface of the substrate and is configured to radiate bidirectionally such that a first ultrasound wave is directed to the first mixing region and a second ultrasound wave is directed to the second mixing region, and wherein the device is configured such that the first and second ultrasound waves reflect off the first surface and the second surface and are directed to a third mixing region and a fourth mixing region.

31. The device of claim 30, wherein the substrate is configured to reflect the first and second ultrasound waves off a third surface of the substrate and to generate additional mixing regions in the thin liquid film.

32. The device of claim 13, wherein a plurality of interdigital transducers are arranged on a second surface of the substrate opposing the first surface and the device is configured to generate a plurality of mixing regions in the thin liquid film.

* * * * *